United States Patent
Weintraub et al.

(10) Patent No.: US 8,204,500 B2
(45) Date of Patent: Jun. 19, 2012

(54) OPTIMAL VOICEMAIL DEPOSIT FOR ROAMING CELLULAR TELEPHONY

(75) Inventors: Guy Weintraub, Ramat-Gan (IL); Noam Danon, Hod-HaSharon (IL)

(73) Assignee: StarHome GmbH, Zurich (CH)

( * ) Notice: Subject to any disclaimer, the term of this patent is extended or adjusted under 35 U.S.C. 154(b) by 656 days.

(21) Appl. No.: 11/646,324

(22) Filed: Dec. 28, 2006

(65) Prior Publication Data

US 2007/0197213 A1 Aug. 23, 2007

Related U.S. Application Data

(60) Provisional application No. 60/754,198, filed on Dec. 28, 2005, provisional application No. 60/755,080, filed on Jan. 3, 2006, provisional application No. 60/776,696, filed on Feb. 27, 2006, provisional application No. 60/788,071, filed on Apr. 3, 2006.

(51) Int. Cl.

| | |
|---|---|
| *H04W 4/00* | (2009.01) |
| *H04M 3/42* | (2006.01) |
| *H04M 3/493* | (2006.01) |
| *H04M 11/10* | (2006.01) |
| *H04M 15/00* | (2006.01) |
| *H04M 7/00* | (2006.01) |
| *H04L 12/58* | (2006.01) |
| *H04B 7/212* | (2006.01) |

(52) U.S. Cl. ............... 455/433; 455/417; 455/414.1; 455/423; 455/432.1; 455/413; 455/412.1; 370/331; 379/114.01; 379/221.13

(58) Field of Classification Search .............. 455/413, 455/433

See application file for complete search history.

(56) References Cited

U.S. PATENT DOCUMENTS

| 2,776,377 A | 1/1957 | Anger |
| 3,340,866 A | 9/1967 | Nöller |
| 3,684,887 A | 8/1972 | Hugonin |

(Continued)

FOREIGN PATENT DOCUMENTS

DE 1516429 12/1969

(Continued)

OTHER PUBLICATIONS

Noldius "CAMEL: Intelligent Networks for the GSM, GPRS and UMTS Network", John Wiley & Sons Ltd., p. 206-207, 2006. Providing Documentary Evidence of Common General Knowledge in the field of CAMEL Phase 3. CAMEL Phase 3 Was Frozen in Mar. 2000. 5.2.4 Camel Service Invocation at Call Failure.

(Continued)

*Primary Examiner* — Patrick Edouard
*Assistant Examiner* — Timothy Pham

(57) ABSTRACT

Apparatus and method for management of optimal voicemail deposit to the voicemail of a currently roaming mobile telephony user during late call forwarding, is located at the user's home network and includes a disconnection unit for disconnecting an international link upon detection of late call forwarding; a triggering unit that ensures that a trigger signal is available for triggering the passing of control of the call to allow direct forwarding of the caller to the voicemail; and a direct forwarding unit that receives the control and carries out the forwarding. Generally the roaming user only generates a single trigger, and this causes difficulties if multiple services need triggering for the same call, such as a prepaid unit and the optimal voicemail deposit. The disclosure teaches methods which when used in combination provide a system that can operate at the home network irrespective of the configuration of the roaming network.

9 Claims, 12 Drawing Sheets

U.S. PATENT DOCUMENTS

| | | |
|---|---|---|
| 3,690,309 A | 9/1972 | Pluzhnikov et al. |
| 3,719,183 A | 3/1973 | Schwartz |
| 3,739,279 A | 6/1973 | Hollis |
| 3,971,362 A | 7/1976 | Pope et al. |
| 4,015,592 A | 4/1977 | Bradley-Moore |
| 4,278,077 A | 7/1981 | Mizumoto |
| 4,364,377 A | 12/1982 | Smith |
| 4,521,688 A | 6/1985 | Yin |
| H000012 H | 1/1986 | Bennett et al. |
| 4,595,014 A | 6/1986 | Barrett et al. |
| 4,674,107 A | 6/1987 | Urban et al. |
| 4,689,041 A | 8/1987 | Corday et al. |
| 4,689,621 A | 8/1987 | Kleinberg |
| 4,731,536 A | 3/1988 | Rische et al. |
| 4,773,430 A | 9/1988 | Porath |
| 4,828,841 A | 5/1989 | Porter et al. |
| 4,844,067 A | 7/1989 | Ikada et al. |
| 4,844,076 A | 7/1989 | Lesho et al. |
| 4,893,013 A | 1/1990 | Denen et al. |
| 4,928,250 A | 5/1990 | Greenberg et al. |
| 4,929,832 A | 5/1990 | Ledley |
| 4,951,653 A | 8/1990 | Fry et al. |
| 4,959,547 A | 9/1990 | Carroll et al. |
| 4,995,396 A | 2/1991 | Inaba et al. |
| 5,014,708 A | 5/1991 | Hayashi et al. |
| 5,032,729 A | 7/1991 | Charpak |
| 5,033,998 A | 7/1991 | Corday et al. |
| 5,070,878 A | 12/1991 | Denen |
| 5,088,492 A | 2/1992 | Takayama et al. |
| 5,119,818 A | 6/1992 | Carroll et al. |
| 5,151,598 A | 9/1992 | Denen |
| 5,170,055 A | 12/1992 | Carroll et al. |
| 5,170,789 A | 12/1992 | Narayan et al. |
| 5,243,988 A | 9/1993 | Sieben et al. |
| 5,246,005 A | 9/1993 | Carroll et al. |
| 5,249,124 A | 9/1993 | DeVito |
| 5,279,607 A | 1/1994 | Schentag et al. |
| 5,299,253 A | 3/1994 | Wessels |
| 5,307,808 A | 5/1994 | Dumoulin et al. |
| 5,349,190 A | 9/1994 | Hines et al. |
| 5,383,456 A | 1/1995 | Arnold et al. |
| 5,386,446 A | 1/1995 | Fujimoto et al. |
| 5,395,366 A | 3/1995 | D'Andrea |
| 5,399,868 A | 3/1995 | Jones et al. |
| 5,415,181 A | 5/1995 | Hogrefe et al. |
| 5,440,614 A | 8/1995 | Sonberg et al. |
| 5,441,050 A | 8/1995 | Thurston et al. |
| 5,448,073 A | 9/1995 | Jeanguillaume |
| 5,475,219 A | 12/1995 | Olson |
| 5,484,384 A | 1/1996 | Fearnot |
| 5,489,782 A | 2/1996 | Wernikoff |
| 5,493,595 A | 2/1996 | Schoolman |
| 5,506,888 A | 4/1996 | Hayes et al. |
| 5,519,221 A | 5/1996 | Weinberg |
| 5,572,999 A | 11/1996 | Funda et al. |
| 5,579,766 A | 12/1996 | Gray |
| 5,604,531 A | 2/1997 | Iddan et al. |
| 5,617,858 A | 4/1997 | Taverna et al. |
| 5,635,717 A | 6/1997 | Popescu |
| 5,657,759 A | 8/1997 | Essen-Moller |
| 5,672,877 A | 9/1997 | Liebig et al. |
| 5,682,888 A | 11/1997 | Olson et al. |
| 5,690,691 A | 11/1997 | Chen et al. |
| 5,694,933 A | 12/1997 | Madden et al. |
| 5,695,500 A | 12/1997 | Taylor et al. |
| 5,716,595 A | 2/1998 | Goldenberg |
| 5,727,554 A | 3/1998 | Kalend et al. |
| 5,729,129 A | 3/1998 | Acker |
| 5,732,704 A | 3/1998 | Thurston et al. |
| 5,734,700 A * | 3/1998 | Hauser et al. ............ 455/413 |
| 5,744,805 A | 4/1998 | Raylman et al. |
| 5,784,432 A | 7/1998 | Kurtz et al. |
| 5,803,914 A | 9/1998 | Ryals et al. |
| 5,811,814 A | 9/1998 | Leone et al. |
| 5,821,541 A | 10/1998 | Tümer |
| 5,833,603 A | 11/1998 | Kovacs et al. |
| 5,842,977 A | 12/1998 | Lesho et al. |
| 5,846,513 A | 12/1998 | Carroll et al. |
| 5,857,463 A | 1/1999 | Thurston et al. |
| 5,871,013 A | 2/1999 | Wainer et al. |
| 5,880,475 A | 3/1999 | Oka et al. |
| 5,900,533 A | 5/1999 | Chou |
| 5,916,167 A | 6/1999 | Kramer et al. |
| 5,928,150 A | 7/1999 | Call |
| 5,932,879 A | 8/1999 | Raylman et al. |
| 5,939,724 A | 8/1999 | Eisen et al. |
| 5,961,457 A | 10/1999 | Raylman et al. |
| 5,984,860 A | 11/1999 | Shan |
| 5,987,350 A | 11/1999 | Thurston |
| 5,993,378 A | 11/1999 | Lemelson |
| 6,002,480 A | 12/1999 | Izatt et al. |
| 6,076,009 A | 6/2000 | Raylman et al. |
| 6,082,366 A | 7/2000 | Andra et al. |
| 6,107,102 A | 8/2000 | Ferrari |
| 6,115,635 A | 9/2000 | Bourgeois |
| 6,129,670 A | 10/2000 | Burdette et al. |
| 6,132,372 A | 10/2000 | Essen-Moller |
| 6,135,955 A | 10/2000 | Madden et al. |
| 6,138,007 A | 10/2000 | Bharatia |
| 6,147,353 A | 11/2000 | Gagnon et al. |
| 6,173,201 B1 | 1/2001 | Front |
| 6,205,347 B1 | 3/2001 | Morgan et al. |
| 6,212,423 B1 | 4/2001 | Krakovitz |
| 6,236,880 B1 | 5/2001 | Raylman et al. |
| 6,239,438 B1 | 5/2001 | Schubert |
| 6,240,312 B1 | 5/2001 | Alfano et al. |
| 6,242,743 B1 | 6/2001 | DeVito |
| 6,246,901 B1 | 6/2001 | Benaron |
| 6,261,562 B1 | 7/2001 | Xu et al. |
| 6,263,229 B1 | 7/2001 | Atalar et al. |
| 6,271,524 B1 | 8/2001 | Wainer et al. |
| 6,271,525 B1 | 8/2001 | Majewski et al. |
| 6,280,704 B1 | 8/2001 | Schutt et al. |
| 6,324,418 B1 | 11/2001 | Crowley et al. |
| 6,339,652 B1 | 1/2002 | Hawkins et al. |
| 6,346,706 B1 | 2/2002 | Rogers et al. |
| 6,368,331 B1 | 4/2002 | Front et al. |
| 6,389,283 B1 | 5/2002 | Sanchez Herrero |
| 6,407,391 B1 | 6/2002 | Mastrippolito et al. |
| 6,420,711 B2 | 7/2002 | Tuemer |
| 6,426,917 B1 | 7/2002 | Tabanou et al. |
| 6,429,431 B1 | 8/2002 | Wilk |
| 6,431,175 B1 | 8/2002 | Penner et al. |
| 6,438,401 B1 | 8/2002 | Cheng et al. |
| 6,453,199 B1 | 9/2002 | Kobozev |
| 6,459,925 B1 | 10/2002 | Nields et al. |
| 6,480,732 B1 | 11/2002 | Tanaka et al. |
| 6,484,051 B1 | 11/2002 | Daniel |
| 6,490,476 B1 | 12/2002 | Townsend et al. |
| 6,510,336 B1 | 1/2003 | Daghighian et al. |
| 6,516,213 B1 | 2/2003 | Nevo |
| 6,525,320 B1 | 2/2003 | Juni |
| 6,525,321 B2 | 2/2003 | Juni |
| 6,549,646 B1 | 4/2003 | Yeh et al. |
| 6,560,354 B1 | 5/2003 | Maurer et al. |
| 6,567,687 B2 | 5/2003 | Front et al. |
| 6,584,348 B2 | 6/2003 | Glukhovsky |
| 6,587,710 B1 | 7/2003 | Wainer |
| 6,592,520 B1 | 7/2003 | Peszynski et al. |
| 6,602,488 B1 | 8/2003 | Daghighian |
| 6,607,301 B1 | 8/2003 | Glukhovsky et al. |
| 6,611,141 B1 | 8/2003 | Schulz et al. |
| 6,614,453 B1 | 9/2003 | Suri et al. |
| 6,615,037 B1 | 9/2003 | Bharatia et al. |
| 6,628,983 B1 | 9/2003 | Gagnon |
| 6,628,984 B2 | 9/2003 | Weinberg |
| 6,632,216 B2 | 10/2003 | Houzego et al. |
| 6,638,752 B2 | 10/2003 | Contag et al. |
| 6,643,538 B1 | 11/2003 | Majewski et al. |
| 6,662,036 B2 | 12/2003 | Cosman |
| 6,680,750 B1 | 1/2004 | Tournier et al. |
| 6,684,072 B1 | 1/2004 | Anvekar et al. |
| 6,728,583 B2 | 4/2004 | Hallett |
| 6,748,259 B1 | 6/2004 | Benaron et al. |
| 6,771,802 B1 | 8/2004 | Patt et al. |
| 6,865,266 B1 | 3/2005 | Pershan |
| 6,943,355 B2 | 9/2005 | Shwartz et al. |

| | | | |
|---|---|---|---|
| 6,963,770 B2 | 11/2005 | Scarantino et al. | |
| 6,996,396 B1 | 2/2006 | Snapp | |
| 7,043,063 B1 | 5/2006 | Noble et al. | |
| 7,142,634 B2 | 11/2006 | Engler et al. | |
| 7,176,466 B2 | 2/2007 | Rousso et al. | |
| 7,181,210 B2* | 2/2007 | Zabawskyj et al. | 455/432.1 |
| 7,187,790 B2 | 3/2007 | Sabol et al. | |
| 7,468,513 B2 | 12/2008 | Charron et al. | |
| 7,490,085 B2 | 2/2009 | Walker et al. | |
| 7,505,769 B2* | 3/2009 | Jiang | 455/432.3 |
| 2002/0072784 A1 | 6/2002 | Sheppard, Jr. et al. | |
| 2002/0085748 A1 | 7/2002 | Baumberg | |
| 2002/0087101 A1 | 7/2002 | Barrick et al. | |
| 2002/0099295 A1 | 7/2002 | Gil et al. | |
| 2002/0103431 A1 | 8/2002 | Toker et al. | |
| 2002/0148970 A1 | 10/2002 | Wong et al. | |
| 2002/0168317 A1 | 11/2002 | Daighighian et al. | |
| 2002/0183645 A1 | 12/2002 | Nachaliel | |
| 2002/0188197 A1 | 12/2002 | Bishop et al. | |
| 2003/0001837 A1 | 1/2003 | Baumberg | |
| 2003/0013966 A1 | 1/2003 | Barnes et al. | |
| 2003/0063787 A1 | 4/2003 | Natanzon et al. | |
| 2003/0072425 A1 | 4/2003 | Hurst | |
| 2003/0081716 A1 | 5/2003 | Tumer | |
| 2003/0148755 A1 | 8/2003 | Bovo et al. | |
| 2003/0191430 A1 | 10/2003 | D'Andrea et al. | |
| 2003/0202629 A1 | 10/2003 | Dunham et al. | |
| 2003/0208117 A1 | 11/2003 | Shwartz et al. | |
| 2004/0003001 A1 | 1/2004 | Shimura | |
| 2004/0010397 A1 | 1/2004 | Barbour et al. | |
| 2004/0015075 A1 | 1/2004 | Kimchy et al. | |
| 2004/0054248 A1 | 3/2004 | Kimchy et al. | |
| 2004/0054278 A1 | 3/2004 | Kimchy et al. | |
| 2004/0081623 A1 | 4/2004 | Eriksen et al. | |
| 2004/0086437 A1 | 5/2004 | Jackson | |
| 2004/0101176 A1 | 5/2004 | Mendonca et al. | |
| 2004/0110489 A1 | 6/2004 | Murri et al. | |
| 2004/0116807 A1 | 6/2004 | Amrami et al. | |
| 2004/0153128 A1 | 8/2004 | Suresh et al. | |
| 2004/0171924 A1 | 9/2004 | Mire et al. | |
| 2004/0203678 A1 | 10/2004 | MacNamara et al. | |
| 2004/0204646 A1 | 10/2004 | Nagler et al. | |
| 2005/0020915 A1 | 1/2005 | Belardinelli et al. | |
| 2005/0055174 A1 | 3/2005 | David et al. | |
| 2005/0205792 A1 | 9/2005 | Rousso et al. | |
| 2005/0215889 A1 | 9/2005 | Patterson, II | |
| 2005/0250493 A1 | 11/2005 | Elkarat et al. | |
| 2005/0253073 A1 | 11/2005 | Joram et al. | |
| 2005/0266074 A1 | 12/2005 | Zilberstein et al. | |
| 2006/0160157 A1 | 7/2006 | Zuckerman | |
| 2006/0237652 A1 | 10/2006 | Kimchy et al. | |
| 2006/0291418 A1* | 12/2006 | Singh | 370/331 |
| 2007/0156047 A1 | 7/2007 | Nagler et al. | |
| 2007/0166227 A1 | 7/2007 | Liu et al. | |
| 2007/0194241 A1 | 8/2007 | Rousso et al. | |
| 2008/0033291 A1 | 2/2008 | Rousso et al. | |
| 2008/0042067 A1 | 2/2008 | Rousso et al. | |
| 2008/0128626 A1 | 6/2008 | Rousso et al. | |
| 2008/0230705 A1 | 9/2008 | Rousso et al. | |
| 2008/0237482 A1 | 10/2008 | Shahar et al. | |
| 2008/0260228 A1 | 10/2008 | Dichterman et al. | |
| 2008/0260637 A1 | 10/2008 | Dickman | |
| 2008/0277591 A1 | 11/2008 | Shahar et al. | |
| 2009/0005037 A1* | 1/2009 | Noldus et al. | 455/433 |
| 2009/0078875 A1 | 3/2009 | Rousso et al. | |
| 2009/0152471 A1 | 6/2009 | Rousso et al. | |
| 2009/0190807 A1 | 7/2009 | Rousso et al. | |
| 2011/0045805 A1 | 2/2011 | Elkarat et al. | |

FOREIGN PATENT DOCUMENTS

| | | |
|---|---|---|
| DE | 19814199 | 10/1999 |
| DE | 19815362 | 10/1999 |
| EP | 0543626 | 5/1993 |
| EP | 0697193 | 2/1996 |
| EP | 0887661 | 12/1998 |
| EP | 1168856 | 1/2002 |
| EP | 1531647 | 5/2005 |
| EP | 1555835 | 7/2005 |
| GB | 2031142 | 4/1980 |
| JP | 06-109848 | 4/1994 |
| WO | WO 92/00402 | 1/1992 |
| WO | WO 99/03003 | 1/1999 |
| WO | WO 99/30610 | 6/1999 |
| WO | WO 99/39650 | 8/1999 |
| WO | WO 00/10034 | 2/2000 |
| WO | WO 00/18294 | 4/2000 |
| WO | WO 00/22975 | 4/2000 |
| WO | WO 00/31522 | 6/2000 |
| WO | WO 01/89384 | 11/2001 |
| WO | WO 02/16965 | 2/2002 |
| WO | WO 02/19686 | 3/2002 |
| WO | WO 02/058531 | 8/2002 |
| WO | WO 2004/042546 | 5/2004 |
| WO | WO 2005/067383 | 7/2005 |
| WO | WO 2005/104939 | 11/2005 |
| WO | WO 2005/118659 | 12/2005 |
| WO | WO 2005/119025 | 12/2005 |
| WO | WO 2006/042077 | 4/2006 |
| WO | WO 2006/051531 | 5/2006 |
| WO | WO 2006/054296 | 5/2006 |
| WO | WO 2006/075333 | 7/2006 |
| WO | WO 2006/129301 | 12/2006 |
| WO | WO 2007/010534 | 1/2007 |
| WO | WO 2007/010537 | 1/2007 |
| WO | WO 2007/054935 | 5/2007 |
| WO | WO 2007/074466 | 7/2007 |
| WO | WO 2007/074467 | 7/2007 |
| WO | WO 2008/010227 | 1/2008 |
| WO | WO 2008/075362 | 6/2008 |

OTHER PUBLICATIONS

Communication Pursuant to Article 94(3) EPC Dated Apr. 24, 2008 From the European Patent Office Re.: Application No. 04105774.6.

European Search Report Dated Sep. 20, 2006 From the European Patent Office Re.: Application No. 04105774.6.

International Search Report Dated Aug. 7, 2007 From the International Searching Authority Re.: Application No. PCT/IL2006/001510.

Official Action Dated Jan. 3, 2007 From the U.S. Patent and Trademark Office Re.: U.S. Appl. No. 10/987,207.

Official Action Dated Nov. 30, 2009 From the US Patent and Trademark Office Re.: U.S. Appl. No. 10/987,207.

Written Opinion Dated Aug. 7, 2007 From the International Searching Authority Re.: Application No. PCT/IL2006/001510.

Appeal Brief Dated Jan. 19, 2010 to Notice of Appeal of Nov. 16, 2009 From the US Patent and Trademark Office Re.: U.S. Appl. No. 10/616,301.

Communication Pursuant to Article 93(3) EPC Dated Mar. 8, 2010 From the European Patent Office Re.: Application No. 06832278.3.

Communication Pursuant to Article 94(3) EPC Dated Mar. 8, 2010 From the European Patent Office Re.: Application No. 06832278.3.

Communication Pursuant to Article 94(3) EPC Dated Oct. 21, 2009 From the European Patent Office Re.: Application No. 02716285.8.

Communication Pursuant to Article 94(3) EPC Dated Jul. 22, 2009 From the European Patent Office Re.: Application No. 06809851.6.

Communication Pursuant to Article 96(2) EPC Dated Jun. 19, 2006 From the European Patent Office Re.: Application No. 03810570.6.

Communication Pursuant to Article 96(2) EPC Dated Aug. 30, 2007 From the European Patent Office Re.: Application No. 03810570.6.

Communication Relating to the Results of the Partial International Search Dated Apr. 18, 2007 From the International Searching Authority of the Patent Cooperation Treaty Re.: Application No. PCT/IL2006/001291.

Communication Relating to the Results of the Partial International Search Dated May 21, 2008 From the International Searching Authority of the Patent Cooperation Treaty Re.: Application No. PCT/IL2007/001588.

International Preliminary Report on Patentability Dated Apr. 16, 2009 From the International Bureau of WIPO Re.: Applicaiton No. PCT/IL2007/000918.

International Preliminary Report on Patentability Dated Jun. 21, 2007 From the International Bureau of WIPO Re.: Application No. PCT/IL2005/000575.

International Preliminary Report on Patentability Dated Jan. 22, 2009 From the International Bureau of WIPO Re.: Application No. PCT/IL2006/000834.
International Preliminary Report on Patentability Dated Jan. 22, 2009 From the International Bureau of WIPO Re.: Application No. PCT/IL2006/001511.
International Preliminary Report on Patentability Dated May 22, 2007 From the International Preliminary Examining Authority Re.: Application No. PCT/IL06/00059.
International Preliminary Report on Patentability Dated May 22, 2008 From the International Bureau of WIPO Re.: Application No. PCT/IL2006/001291.
International Preliminary Report on Patentability Dated May 24, 2007 From the International Bureau of WIPO Re.: Application No. PCT/IL2005/001173.
International Preliminary Report on Patentability Dated Apr. 26, 2007 From the International Bureau of WIPO Re.: Application No. PCT/IL2005/000394.
International Preliminary Report on Patentability Dated Jan. 31, 2008 From the International Bureau of WIPO Re.: Application No. PCT/IL2006/000840.
International Search Report Dated Oct. 10, 2006 From the International Searching Authority of the Patent Cooperation Treaty Re.: Application No. PCT/IL06/00059.
International Search Report Dated Jul. 11, 2008 From the International Searching Authority of the Patent Cooperation Treaty Re.: Application No. PCT/IL06/01511.
International Search Report Dated Jul. 25, 2008 From the International Searching Authority of the Patent Cooperation Treaty Re.: Application No. PCT/IL2007/001588.
International Search Report Dated Feb. 1, 2006 From the international Searching Authority of the Patent Cooperation Treaty Re.: Application No. PCT/IL05/00048.
International Search Report Dated Jul. 1, 2008 From the International Searching Authority of the Patent Cooperation Treaty Re.: Application No. PCT/IL06/00834.
International Search Report Dated Nov. 1, 2007 From the International Searching Authority of the Patent Cooperation Treaty Re.: Application No. PCT/IL06/00840.
International Search Report Dated Jul. 2, 2007 From the International Searching Authority of the Patent Cooperation Treaty Re.: Application No. PCT/IL2006/001291.
International Search Report Dated Aug. 3, 2006 From the International Searching Authority of the Patent Cooperation Treaty Re.: Application No. PCT/IL05/001173.
International Search Report Dated May 11, 2006 From the International Searching Authority of the Patent Cooperation Treaty Re.: Application No. PCT/IL05/001215.
International Search Report Dated Sep. 11, 2002 From the International Searching Authority of the Patent Cooperation Treaty Re.: Application No. PCT/IL01/00638.
International Search Report Dated Sep. 12, 2002 From the International Searching Authority of the Patent Cooperation Treaty Re: Application No. PCT/IL02/00057.
International Search Report Dated Oct. 15, 2008 From the International Searching Authority Re.: Application No. PCT/IL07/00918.
International Search Report Dated Mar. 18, 2004 From the International Searching Authority of the Patent Cooperation Treaty Re.: Application No. PCT/IL03/00917.
International Search Report Dated Mar. 23, 2006 From the International Searching Authority of the Patent Cooperation Treaty Re.: Application No. PCT/IL05/00572.
International Search Report Dated May 24, 2007 From the International Searching Authority of the Patent Cooperation Treaty Re.: Application No. PCT/IL05/00575.
International Search Report Dated Mar. 26, 2007 From the international Searching Authority of the Patent Cooperation Treaty Re.: Application No. PCT/IL05/00394.
Invitation to Pay Additional Fees Dated Jul. 10, 2008 From the International Searching Authority Re.: Application No. PCT/IL06/01511.
Invitation to Pay Additional Fees Dated Feb. 15, 2007 From the International Searching Authority Re.: Application No. PCT/IL05/00575.
Notice of Allowance Dated Jul. 16, 2009 From the US Patent and Trademark Office Re.: U.S. Appl. No. 12/084,559.
Notice of Allowance Dated Sep. 17, 2009 From the US Patent and Trademark Office Re.: U.S. Appl. No. 10/533,568. Suppl. IDS VIII in 25855.
Notice of Allowance Dated Nov. 23, 2009 From the US Patent and Trademark Office Re.: U.S. Appl. No. 12/084,559.
Notice of Appeal and Pre-Appeal Brief Dated Jan. 4, 2010 to Official Action of Sep. 2, 2009 From the US Patent and Trademark Office Re.: U.S. Appl. No. 10/343,792.
Notice of Appeal Dated Nov. 16, 2009 to Official Action of Jul. 15, 2009 From the US Patent and Trademark Office Re.: U.S. Appl. No. 10/616,301.
Office Action Dated Dec. 2, 2007 From the Israeli Patent Office Re.: Application No. 158442.
Office Action Dated Jan. 2, 2006 From the Israeli Patent Office Re.: Application No. 154323.
Office Action Dated Sep. 4, 2007 From the Israeli Patent Office Re.: Application No. 157007.
Office Action Dated Jul. 17, 2007 From the Israeli Patent Office Re.: Application No. 154323.
Official Action Dated Jun. 1, 2006 From the US Patent and Trademark Office Re.: U.S. Appl. No. 10/686,536.
Official Action Dated Mar. 1, 2010 From the US Patent and Trademark Office Re.: U.S. Appl. No. 11/794,799.
Official Action Dated Sep. 1, 2009 From the US Patent and Trademark Office Re.: U.S. Appl. No. 11/794,799.
Official Action Dated Jul. 2, 2004 From the US Patent and Trademark Office Re.: U.S. Appl. No. 09/641,973.
Official Action Dated Mar. 2, 2010 From the US Patent and Trademark Office Re.: U.S. Appl. No. 10/836,223.
Official Action Dated Mar. 2, 2010 From the US Patent and Trademark Office Re.: U.S. Appl. No. 11/980,617.
Official Action Dated Sep. 2, 2009 From the US Patent and Trademark Office Re.: U.S. Appl. No. 10/343,792.
Official Action Dated May 3, 2007 From the US Patent and Trademark Office Re.: U.S. Appl. No. 10/240,239.
Official Action Dated Sep. 4, 2008 From the US Patent and Trademark Office Re.: U.S. Appl. No. 10/533,568.
Official Action Dated Sep. 5, 2002 From the US Patent and Trademark Office Re.: U.S. Appl. No. 12/084,559.
Official Action Dated Jan. 7, 2009 From the US Patent and Trademark Office Re.: U.S. Appl. No. 10/616,307.
Official Action Dated Jul. 7, 2009 From the US Patent and Trademark Office Re.: U.S. Appl. No. 10/533,568.
Official Action Dated Oct. 7, 2008 From the US Patent and Trademark Office Re.: U.S. Appl. No. 10/616,301.
Official Action Dated Apr. 8, 2010 From the US Patent and Trademark Office Re.: U.S. Appl. No. 11/980,690.
Official Action Dated Dec. 8, 2009 From the US Patent and Trademark Office Re.: U.S. Appl. No. 11/132,320.
Official Action Dated Jan. 8, 2010 From the US Patent and Trademark Office Re.: U.S. Appl. No. 11/656,548.
Official Action Dated Apr. 9, 2010 From the US Patent and Trademark Office Re.: U.S. Appl. No. 11/798,017.
Official Action Dated Aug. 10, 2007 From the US Patent and Trademark Office Re.: U.S. Appl. No. 10/836,223.
Official Action Dated Aug. 11, 2009 From the US Patent and Trademark Office Re.: U.S. Appl. No. 09/641,973.
Official Action Dated Mar. 11, 2010 From the US Patent and Trademark Office Re.: U.S. Appl. No. 11/607,075.
Official Action Dated Jul. 12, 2007 From the US Patent and Trademark Office Re.: U.S. Appl. No. 10/616,301.
Official Action Dated Dec. 13, 2007 From the US Patent and Trademark Office Re.: U.S. Appl. No. 10/616,301.
Official Action Dated May 13, 2009 From the US Patent and Trademark Office Re.: U.S. Appl. No. 11/798,017.
Official Action Dated May 14, 2009 From the US Patent and Trademark Office Re.: U.S. Appl. No. 11/656,548.

Official Action Dated Apr. 15, 2008 From the US Patent and Trademark Office Re.: U.S. Appl. No. 09/641,973.
Official Action Dated Dec. 15, 2006 From the US Patent and Trademark Office Re.: U.S. Appl. No. 10/616,301.
Official Action Dated Feb. 15, 2008 From the US Patent and Trademark Office Re.: U.S. Appl. No. 10/343,792.
Official Action Dated Jul. 15, 2008 From the US Patent and Trademark Office Re.: U.S. Appl. No. 09/641,973.
Official Action Dated Jul. 15, 2009 From the US Patent and Trademark Office Re.: U.S. Appl. No. 10/616,301.
Official Action Dated Mar. 15, 2004 From the US Patent and Trademark Office Re.: U.S. Appl. No. 09/725,316.
Official Action Dated Sep. 15, 2009 From the US Patent and Trademark Office Re.: U.S. Appl. No. 10/616,307.
Official Action Dated Sep. 15, 2009 From the US Patent and Trademark Office Re.: U.S. Appl. No. 10/836,223.
Official Action Dated Dec. 16, 2008 From the US Patent and Trademark Office Re.: U.S. Appl. No. 10/343,792.
Official Action Dated Sep. 16, 2009 From the US Patent and Trademark Office Re.: U.S. Appl. No. 09/727,464.
Official Action Dated Jan. 17, 2006 From the United States Patent and Trademark Office Re.: U.S. Appl. No. 11/034,007.
Official Action Dated Mar. 19, 2010 From the US Patent and Trademark Office Re.: U.S. Appl. No. 10/240,239.
Official Action Dated Apr. 20, 2006 From the United States Patent and Trademark Office Re.: U.S. Appl. No. 10/240,239.
Official Action Dated Jul. 20, 2009 From the US Patent and Trademark Office Re.: U.S. Appl. No. 11/980,617.
Official Action Dated Mar. 21, 2008 From the US Patent and Trademark Office Re.: U.S. Appl. No. 10/533,568.
Official Action Dated Sep. 21, 2009 From the US Patent and Trademark Office Re.: U.S. Appl. No. 11/798,017.
Official Action Dated Dec. 23, 2008 From the US Patent and Trademark Office Re.: U.S. Appl. No. 09/727,464.
Official Action Dated Feb. 23, 2010 From the US Patent and Trademark Office Re.: U.S. Appl. No. 09/641,973.
Official Action Dated Jun. 23, 2006 From the United States Patent and Trademark Office Re.: U.S. Appl. No. 09/727,464.
Official Action Dated Jun. 25, 2008 From the US Patent and Trademark Office Re.: U.S. Appl. No. 10/616,301.
Official Action Dated Sep. 25, 2006 From the US Patent and Trademark Office Re.: U.S. Appl. No. 10/616,301.
Official Action Dated Nov. 26, 2008 From the US Patent and Trademark Office Re.: U.S. Appl. No. 10/240,239.
Official Action Dated Apr. 28, 2010 From the US Patent and Trademark Office Re.: U.S. Appl. No. 10/616,301.
Official Action Dated Aug. 28, 2009 From the US Patent and Trademark Office Re.: U.S. Appl. No. 10/240,239.
Official Action Dated Apr. 29, 2009 From the US Patent and Trademark Office Re.: U.S. Appl. No. 11/980,690.
Official Action Dated Oct. 30, 2009 From the US Patent and Trademark Office Re.: U.S. Appl. No. 11/980,690.
Official Action Dated Sep. 30, 2008 From the US Patent and Trademark Office Re.: U.S. Appl. No. 10/616,301.
Response Dated Apr. 7, 2009 to Official Action of Oct. 7, 2008 From the US Patent and Trademark Office Re.: U.S. Appl. No. 10/616,301.
Response Dated Dec. 10, 2009 to Official Action of Aug. 11, 2009 From the US Patent and Trademark Office Re.: U.S. Appl. No. 09/641,973.
Response Dated May 10, 2010 to Official Action of Apr. 8, 2010 From the US Patent and Trademark Office Re.: U.S. Appl. No. 11/980,690.
Response Dated May 10, 2010 to Official Action of Jan. 8, 2010 From the US Patent and Trademark Office Re.: U.S. Appl. No. 11/656,548.
Response Dated Oct. 12, 2009 to Notice of Allowance of Jul. 16, 2009 From the US Patent and Trademark Office Re.: U.S. Appl. No. 12/084,559.
Response Dated Mar. 13, 2008 to Official Action of Dec. 13, 2007 From the US Patent and Trademark Office Re.: U.S. Appl. No. 10/616,301.
Response Dated Aug. 14, 2008 to Official Action of Apr. 15, 2008 From the US Patent and Trademark Office Re.: U.S. Appl. No. 09/727,464.
Response Dated Jan. 14, 2010 to Official Action of Sep. 15, 2009 From the US Patent and Trademark Office Re.: U.S. Appl. No. 10/616,307.
Response Dated Jan. 14, 2010 to Official Action of Sep. 15, 2009 From the US Patent and Trademark Office Re.: U.S. Appl. No. 10/836,223.
Response Dated Oct. 14, 2009 to Official Action of May 14, 2009 From the US Patent and Trademark Office Re.: U.S. Appl. No. 11/656,548.
Response Dated Mar. 15, 2007 to Official Action of Dec. 15, 2006 From the US Patent and Trademark Office Re.: U.S. Appl. No. 10/616,301.
Response Dated Jan. 21, 2010 to Official Action of Sep. 21, 2009 From the US Patent and Trademark Office Re.: U.S. Appl. No. 11/798,017.
Response Dated Feb. 22, 2010 to Communication Pursuant to Article 94(3) EPC of Oct. 21, 2009 From the European Patent Office Re.: Application No. 02716285.8.
Response Dated Sep. 22, 2008 to Official Action of Jun. 25, 2008 From US Patent and Trademark Office Re.: U.S. Appl. No. 10/616,301.
Response Dated Nov. 25, 2005 to Office Action of May 13, 2005 From the Patent Office of the People's Republic of China Re.: Application No. 1817689.5.
Response Dated Dec. 28, 2009 to Official Action of Aug. 28, 2009 From the US Patent and Trademark Office Re.: U.S. Appl. No. 10/240,239.
Response Dated Dec. 30, 2009 to Official Action of Sep. 1, 2009 From the US Patent and Trademark Office Re.: U.S. Appl. No. 11/794,799.
Response Dated Dec. 30, 2009 to Official Action of Oct. 30, 2009 From the US Patent and Trademark Office Re.: U.S. Appl. No. 11/980,690.
Response Dated Oct. 31, 2007 to Official Action of Jul. 12, 2007 From the US Patent and Trademark Office Re.: U.S. Appl. No. 10/616,301.
Response to the International Search Report and the Written Opinion of Oct. 10, 2006 From the International Searching Authority Re.: Appliction No. PCT/IL06/00059.
Second International Search Report Dated Jun. 1, 2009 From the International Searching Authority Re.: Application No. PCT/IL07/00918.
Summons to Attend Oral Proceedings Pursuant to Rule 115(1) Epc Dated Jan. 16, 2009 From the European Patent Office Re.: Application No. 03810570.6.
Supplementary European Search Report Dated Dec. 12, 2005 From the European Patent Office Re.: Application No. 03810570.6.
Supplementary Partial European Search Report and the European Search Opinion Dated Dec. 15, 2009 From the European Patent Office Re.: Application No. 06832278.3.
Supplementary Partial European Search Report and the European Search Opinion Dated Oct. 16, 2009 From the European Patent Office Re.: Application No. 06756259.5.
Supplementary Partial European Search Report Dated Sep. 4, 2007 From the European Patent Office Re.: Application No. 0 2716285.8.
Supplementary Partial European Search Report Dated Nov. 11, 2008 From the European Patent Office Re.: Application No. 01951883.6.
Supplementary Partial European Search Report Dated Nov. 20, 2007 From the European Patent Office Re.: Application No. 02716285.8.
Translation of Office Action Dated May 13, 2005 From the Patent Office of the People's Republic of China Re.: Application No. 01817689.5.
Written Opinion Dated Feb. 1, 2006 From the International Searching Authority of the Patent Cooperation Treaty Re.: Application No. PCT/IL05/00048.
Written Opinion Dated Jul. 1, 2008 From the International Searching Authority of the Patent Cooperation Treaty Re.: Application No. PCT/IL06/00834.
Written Opinion Dated Jul. 2, 2007 From the International Searching Authority of the Patent Cooperation Treaty Re.: Application No. PCT/IL2006/001291.

Written Opinion Dated Aug. 3, 2006 From the International Searching Authority of the Patent Cooperation Treaty Re.: Application No. PCT/IL05/001173.
Written Opinion Dated Oct. 10, 2006 From the International Searching Authority of the Patent Cooperation Treaty Re.: Application No. PCT/IL06/00059.
Written Opinion Dated Oct. 15, 2008 From the International Searching Authority Re.: Application No. PCT/IL07/00918.
Written Opinion Dated Mar. 23, 2006 From the International Searching Authority of the Patent Cooperation Treaty Re.: Application No. PCT/IL05/00572.
Written Opinion Dated May 24, 2007 From the International Searching Authority of the Patent Cooperation Treaty Re.: Application No. PCT/IL05/00575.
Written Opinion Dated Jul. 25, 2008 From the International Searching Authority of the Patent Cooperation Treaty Re.: Application No. PCT/IL05/001173.
Written Opinion Dated Mar. 26, 2007 From the International Searching Authority of the Patent Cooperation Treaty Re.: Application No. PCT/IL05/00394.
Aoi et al. "Absolute Quantitation of Regional Myocardial Blood Flow of Rats Using Dynamic Pinhole SPECT", IEEE Nuclear Science Symposium and Medical Imaging Conference Record, 3: 1780-1783, 2002. Abstract, Figs.
Bloch et al. "Application of Computerized Tomography to Radiation Therapy and Surgical Planning", Proceedings of the IEEE, 71(3): 351-355, Mar. 1983.
Bromiley et al. "Attenuation Correction in PET Using Consistency Conditions and A Three-Dimensional Template", IEEE Transactions on Nuclear Science, XP002352920, 48(4): 1371-1377, 2001. p. 1376, col. 2, § 2.
Corstens et al. "Nuclear Medicine's Role in Infection and Inflammation", The Lancet, 354: 765-770, 1999.
Day et al. "Localization of Radioiodinated Rat Fibrogen in Transplanted Rat Tumors", Journal of the National Cancer Institute, 23(4): 799-812, 1959.
Erbil et al. "Use and Limitations of Serum Total and Lipid-Bound Sialic Acid Concentrations as Markers for Colorectal Cancer", Cancer, 55: 404-409, 1985.
Garcia et al. "Accuracy of Dynamic SPECT Acquisition for Tc-99m Teboroxime Myocardial Perfusion Imaging: Preliminary Results", American College of Cardiology, 51st Annual Scientific Session, Atlanta, Georgia, USA, 8 P., 2002.
Gilland et al. "A 3D Model of Non-Uniform Attenuation and Detector Response for Efficient Iterative Reconstruction in SPECT", Physics in Medicine and Biology, XP002558623, 39(3): 547-561, Mar. 1994. p. 549-550, Section 2.3 'Active Voxel Reconstruction', p. 551, Lines 4-8.
Gilland et al. "Simultaneous Reconstruction and Motion Estimation for Gated Cardiac ECT", IEEE Transactions on Nuclear Science, XP011077797, 49(5): 2344-2349, Oct. 1, 2002. p. 2344, Section 'Introduction', First §.
Gugnin et al "Radiocapsule for Recording the Ionizing Radiation in the Gastrointestinal Tract", UDC 615. 417:616.34-005.1-073.916-71 (All-Union Scientific-Research Institute of medical Instrument Design, Moscow. Translated from Meditsinskaya Tekhnika, 1:21-25, Jan.-Feb. 1972).
Hassan et al. "A Radiotelemetry Pill for the Measurement of Ionising Radiation Using a Mercuric Iodide Detector", Physics in Medicine and Biology, 23(2): 302-308, 1978.
Hayakawa et al. "A PET-MRI Registration Technique for PET Studies of the Rat Brain", Nuclear Medicine & Biology, 27: 121-125, 2000. p. 121, col. 1.
Hoffman et al. "Intraoperative Probes and Imaging Probes", European Journal of Nuclear Medicine, 26(8): 913-935, 1999.
Huesman et al. "Kinetic Parameter Estimation From SPECT Cone-Beam Projection Measurements", Physics in Medicine and Biology, 43(4): 973-982, 1998.
Jeanguillaume et al. "From the Whole-Body Counting to Imaging: The Computer Aided Collimation Gamma Camera Project (CACAO)", Radiation Projection Dosimetry 89(3-4): 349-352, 2000.
Jessup "Tumor Markers—Prognostic and Therapeutic Implications for Colorectal Carcinoma", Surgical Oncology, 7: 139-151, 1998.

Kadrmas et al. "Static Versus Dynamic Teboroxime Myocardial Perfusion SPECT in Canines", IEEE Transactions on Nuclear Science, 47(3): 1112-1117, Jun. 2000.
Kinahan et al. "Attenuation Correction for a Combined 3D PET/CT Scanner", Medical Physics, 25(10): 2046-2053, Oct. 1998.
Kojima et al. "Quantitative Planar Imaging Method for Measurement of Renal Activity by Using a Conjugate-Emission Image and Transmission Data", Medical Physics, 27(3): 608-615, 2000. p. 608.
Lavallée et al. "Building a Hybrid Patient's Model for Augmented Reality in Surgery: A Registration Problem", Computing in Biological Medicine, 25(2): 149-164, 1995.
Li et al. "A HOTLink/Networked PC Data Acquisition and Image Reconstruction System for a High Resolution Whole-Body PET With Respiratory or ECG-Gated Performance", IEEE Nuclear Sience Symposium and Medical Imaging Conference, Norfolk, VA, USA, Nov. 10-16, 2002, XP010663724, 2: 1135-1139, Nov. 10, 2002. p. 1137, First Col., 2nd §.
Molinolo et al. "Enhanced Tumor Binding Using Immunohistochemical Analyses by Second Generation Anti-Tumor-Associated Glycoprotein 72 Monoclonal Antibodies versus Monoclonal Antibody B72.3 in Human Tissue", Cancer Research, 50: 1291-1298, 1990.
Moore et al. "Quantitative Multi-Detector Emission Computerized Tomography Using Iterative Attenuation Compensation", Journal of Nuclear Medicine, XP002549083, 23(8): 706-714, Aug. 1982. Abstract, p. 707, Section 'The Multi-Detector Scanner', First §.
Mori et al. "Overexpression of Matrix Metalloproteinase-7mRNA in Human Colon Carcinomas", Cancer, 75: 1516-1519, 1995.
Ogawa et al. "Ultra High Resoultion Pinhole SPECT", IEEE Nuclear Science Symposium, 2: 1600-1604, 1998.
Pardridge et al. "Tracer Kinetic Model of Blood-Brain Barrier Transport of Plasma Protein-Bound Ligands", Journal of Clinical Investigation, 74: 745-752, 1984. Suppl. IDS in 27480.
Pellegrini et al. "Design of Compact Pinhole SPECT System Based on Flat Panel PMT", IEEE Nuclear Science Symposium Conference Record, 3: 1828-1832, 2003.
Piperno et al. "Breast Cancer Screening by Impedance Measurements", Frontiers Med. Biol. Engng., 2(2): 11-17, 1990.
Qi et al. "Resolution and Noise Properties of MAP Reconstruction for Fully 3-D PET", IEEE Transactions on Medical Imaging, XP002549082, 19(5): 493-506, May 2000. p. 493, col. 2, Lines 10-21, p. 8495, col. 1, Last §.
Quartuccia et al. "Computer Assisted Collimation Gama Camera: A New Approach to Imaging Contaminated Tissues", Radiation Projection Dosimetry, 89(3-4): 343-348, 2000.
Rajshekhar "Continuous Impedence Monitoring During CT-Guided Stereotactic Surgery: Relative Value in Cystic and Solid Lesions", British Journal of Neurosurgery, 6: 439-444, 1992.
Reutter et al. "Direct Least Squares Estimation of Spatiotemporal Distributions From Dynamic SPECT Projections Using a Spatial Segmentation and Temporal B-Splines", IEEE Transactions on Medical Imaging, 19(5): 434-450, 2000.
Reutter et al. "Kinetic Parameter Estimation From Attenuated SPECT Projection Measurements", IEEE Transactions on Nuclear Science, 45(6): 3007-3013, 1998.
Stoddart et al. "New Multi-Dimensional Reconstructions for the 12-Detector, Scanned Focal Point, Single-Photon Tomograph", Physics in Medicine and Biology, XP020021960, 37(3): 579-586, Mar. 1, 1992. p. 582, § 2-p. 585, § 1.
Takahashi et al. "Attenuation Correction of Myocardial SPECT Images With X-Ray CT: Effects of Registration Errors Between X-Ray CT and SPECT", Annals of Nuclear Medicine, 16(6): 431-435, Sep. 2002.
Wilson et al. "Non-Stationary Noise Characteristics for SPECT Images", Proceedings of the Nuclear Science Symposium and Medical Imaging Conference, Santa Fe, CA, USA, Nov. 2-9, 1991, XP010058168, p. 1736-1740, Nov. 2, 1991. p. 1736, col. 2, Lines 4-6.
Wu et al. "ECG-Gated Pinhole SPECT in Mice With Millimeter Spatial Resolution", IEEE Transactions on Nuclear Science, 47(3) 1218-1221, Jun. 2000.

Yu et al. "Using Correlated CT Images in Compensation for Attenuation in PET Image Reconstruction", Proceedings of the SPIE, Applications of Optical Engineering: Proceedings of OE/Midwest '90, 1396: 56-58, 1991.

Zaidi et al. "Magenetic Resonance Imaging-Guided Attenuation and Scatter Corrections in Three-Dimensional Brain Positron Emission Tomography", Medical Physics, 30(5): 937-948, May 2003.

Zaidi et al. "MRI-Guided Attenuation Correction in 3D Brain PET", Neuroimage Human Brain Mapping 2002 Meeting, 16(2): Abstract 504, Jun. 2002.

Zhang et al. "An Innovative High Efficiency and High Resolution Probe for Prostate Imaging", The Journal of Nuclear Medicine, 68: 18, 2000. Abstract.

Response Dated Jul. 13, 2011 to Official Action of Apr. 13, 2011 From the US Patent and Trademark Office Re. U.S. Appl. No. 12/916,669.

Response Dated Jun. 13, 2011 to Communication of Notices of Opposition (Rule 79(1) EPC) of Jan. 13, 2011 From the European Patent Office Re. Application No. 04105774.6.

Communication of a Notice of Opposition Dated Dec. 9, 2010 From the European Patent Office Re. Application No. 04105774.6.

GSM "3rd Generation Partnership Project (3GPP™); Technical Specification Group Core Network; Customised Applications for Mobile Network Enhanced Logic (CAMEL) Phase 3—Stage 2 (Release 4)", GSM, Global System for Mobile Communications, 3GPP TS 23.078, V4.10.0, Sep. 2003.

GSM "3rd Generation Partnership Project (3GPP™); Technical Specification Group Core Network; Support of Optimal Routeing (SOR); Technical Realization (Release 5)", GSM, Global System for Mobile Communications, 3GPP TS 23.079, V5.3.0, Sep. 2003.

GSM "3rd Generation Partnership Project (3GPP™); Technical Specification Group Services and System Aspects; Line Identification Supplementary Services; Stage 1 (Release 5)", GSM, Global System for Mobile Communications, 3GPP TS 22.081, V5.0.0, Jun. 2002.

ITU "Series Q: Switching and Signalling: Specifications of Signalling System No. 6", ITU, International Telecommunication Union, ITU-T, Telecommunication Standardization Sector of ITU, Q.251-Q.300, Nov. 1988.

Lagrange et al. "Réseaux Intelligents et CAMEL", Réseaux GSM des Principes à la Norme, HERMES Science Publications, 5e Edition Revue et Augmentée, Annexe 2, 2000.

Response Dated May 29, 2011 to Communication Pursuant to Article 94(3) EPC of Jan. 18, 2011 From the European Patent Office Re. 06832277.5.

Communication of Notices of Opposition (Rule 79(1) EPC) Dated Jan. 13, 2011 From the European Patent Office Re. Application No. 04105774.6.

Official Action Dated Apr. 13, 2011 From the US Patent and Trademark Office Re. U.S. Appl. No. 12/916,669.

Official Action Dated Oct. 13, 2011 From the US Patent and Trademark Office Re. U.S. Appl. No. 12/916,669.

Summons to Attend Oral Proceedings Pursuant to Rule 115(1) EPC Dated Oct. 5, 2011 From the European Patent Office Re. Application No. 04105774.6.

* cited by examiner

OPTIMAL VOICEMAIL DEPOSIT FOR ROAMING CELLULAR TELEPHONY

RELATIONSHIP TO EXISTING APPLICATIONS

This application claims the benefit of U.S. Provisional Patent Applications Nos. 60/754,198, filed on Dec. 28, 2005, 60/755,080 filed on Jan. 3, 2006, 60/776,696 filed on Feb. 27, 2006 and 60/788,071 filed on Apr. 3, 2006. The contents of the above applications are hereby incorporated by reference.

FIELD AND BACKGROUND OF THE INVENTION

The present invention relates to an optimal voicemail deposit system for a roaming user whose voicemail is on a home network, which is different from the network where he is currently roaming, and, more particularly, but not exclusively to an optimal voicemail deposit system which is suitable for both prepaid and postpaid users.

Mobile subscribers usually set call forwarding to the voicemail, so that if they cannot answer a call for whatever reason, then the caller has an opportunity to leave them a message. Call forwarding may be divided into two categories, early call forwarding and late call forwarding. Late call forwarding is performed conditionally, due to the subscriber's inability to answer a call routed to the handset. Conversely, early call forwarding is performed without the network attempting to route the call to the handset. This happens when the handset is shut off or when the subscriber requests unconditional forwarding of all incoming calls. Late Call Forwarding for busy/no-answer/not-reachable conditions can be configured to any number and is usually configured to the subscriber's voice mailbox.

Mobile subscribers roaming abroad want to stay in touch with work and home, and to continue to use their mobile services, such as voicemail. Naturally, they also want the same user experience as that in the home network—such as seamless caller access to mailbox, caller-ID indication upon retrieval and direct forwarding of calls to their voice mailbox or to any of their pre-set forwarding destinations. It goes without saying that they expect the same user experience for their callers.

However, when a roamer cannot take a call, he may either be unavailable, busy or simply may choose not to answer—the visited network routes the call back to the home voicemail system, which is the default setting for most roamers. As the originating call was most probably made in the home network, the rerouting in turn causes inefficient international tromboning, that is to say the call is connected from the home country to the roaming country and back to the home country. The result is that the called party has to pay for two International legs, resulting in a negative impact on the caller and in subscriber experience and forces roamers to pay international tariffs for voicemail deposits.

FIG. 1 illustrates the existing non-optimal routing late call forwarding while roaming. The figure shows a home network 10 and a visited network 12. A call originates at the home network and is forwarded to the roaming user at the visited network. The user at the visited network does not answer the call, and the call is routed from the visited network to the user's voicemail at voicemail server 14 at the home network 10. At this point two international connections 16 and 18 simultaneously exist for the same call.

The Result: Reduced Service and Use

Higher subscriber costs—The high cost to the user caused by the international tromboning of voicemail causes many roamers to disable voicemail forwarding while roaming. Some home networks disable call forwarding for their outbound roaming subscribers, in order to avoid subscriber frustration.

Complicated use—Due to the filtering of signaling data by switch vendors and by some international networks, the original dialed number may not be transferred to the home network's voicemail system via these doubled International links. This forces the caller to re-enter the original dialed number. For the same reason, Caller ID is not available to the voicemail system and the phone number of the caller is not provided during message retrieval, resulting in a voicemail message whose origin cannot be traced if not self-explanatory from the message itself.

Higher operator costs—Roaming subscribers, unaware of the high cost of forwarding calls, may be surprised and angered when receiving their monthly bills. The immediate response is usually to call Customer Care to complain and inquire about the charges. In addition to customer dissatisfaction, this in turn engages operator's manpower and communications resources.

Loss of potential revenue—Disabling call forwarding to voicemail while roaming—either by the subscriber or by the operator—means loss of potential revenue that otherwise would have come from:
  Originator call completion
  Subscriber voicemail retrieval
  Subscriber call back There is thus a widely recognized need for, and it would be highly advantageous to have, a late call forwarding system for roaming users which is devoid of the above limitations.

SUMMARY OF THE INVENTION

According to one aspect of the present invention there is provided apparatus for management of optimal voicemail deposit to the voicemail of currently roaming mobile telephony user during late call forwarding, the apparatus being located at the home network of said user, the apparatus comprising:

a triggering unit configured to set a trigger for a mobile terminated call directed to a subscriber of the home network roaming in a visited network, such that when the call is disconnected, the control of the call is handed over for direct forwarding, said setting being irrespective of triggering being required for other purposes;

a disconnection unit for disconnecting an international link in a mobile terminated call following subjecting of said call to a late call forwarding;

a direct forwarding unit for forwarding a caller to said voicemail, thereby providing an optimal voicemail deposit.

According to a second aspect of the present invention there is provided a method for management of optimal voicemail deposit to the voicemail of currently roaming mobile telephony user during late call forwarding, the method being carried out at the home network of said user, the method comprising:

providing a trigger signal for passing control of a late forwarded call to allow direct forwarding to a respective voicemail;

disconnecting an international link associated with said call; and using said trigger making said direct forwarding to said voicemail.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
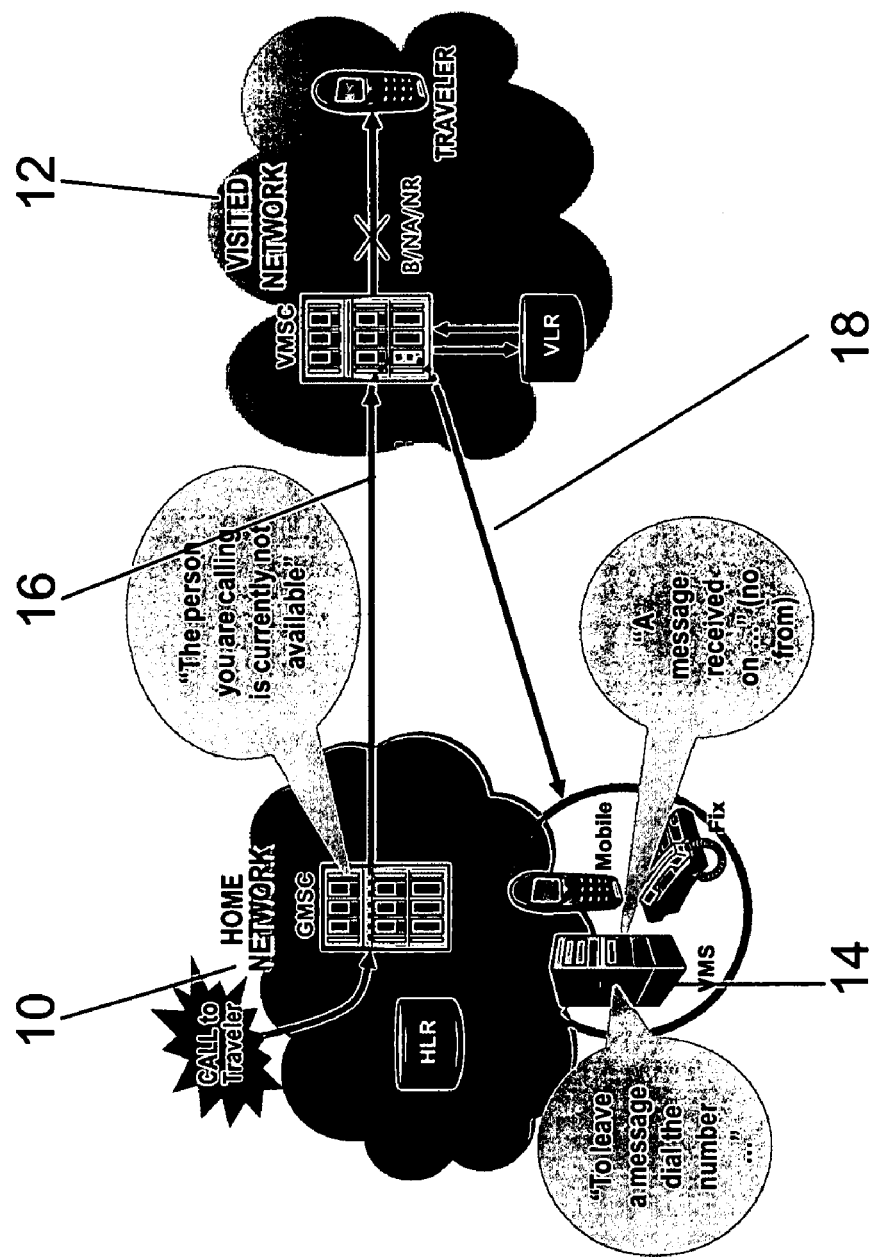
FIG. 1 is a simplified diagram showing existing voicemail deposit architectures including a double International leg or tromboning.

The present embodiments comprise apparatus and methods for alerting the home network about call forwarding involving a roamer so that the home network can forward the caller directly to the voicemail and disconnect the International link. In this way not only is tromboning avoided, but also the connection to the voicemail works better because the caller ID is correctly forwarded to the voicemail.

The GSM standard includes features to avoid International tromboning but these have never effectively been implemented. The present inventors, in one embodiment, instead of relying on the eventual implementation of these features, make use of the roaming trigger that the home network in fact does issue. This raises the problem that the roaming trigger may be required for other purposes, in particular for alerting the system in the case of a pre-paid subscriber to ensure that his prepayment covers the roaming interaction. The present inventors have inter alia solved the problem in such a way that call forwarding to the voicemail is carried out regardless of other requirements of the roaming trigger. As a result there is a call forwarding system that is equally applicable to pre-paid and post-paid users.

In an alternative embodiment the present inventors have found a way of taking advantage of the partial adoption of the features in the GSM standard to allow a given network that at least partly uses the features to view other networks as if they use the features.

The above embodiments are jointly or severally incorporated into an Optimal Voicemail Deposit (OVMD) service, in order to overcome the above-described problem of international tromboning that is caused by incomplete signaling when a called party traveling abroad cannot answer a call and the call is diverted to the home VMS or to another pre-set forwarding destination.

Optimal voicemail deposit is intended to improve the caller's experience and to significantly reduce the cost of voicemail deposits billed to the roaming subscriber, thereby allowing mobile operators to regain previously lost revenue. The OVMD system is supported by gateways provided at the networks of the mobile operators to support roaming users, and the gateways provide a comprehensive package of connectivity services to their outbound roaming subscribers. The roaming gateways are alternately referred to herein as Intelligates.

The Optimal Voicemail Deposit service provides the following benefits:

Direct forwarding—The caller receives direct in-network access to the forwarded destination, whatever number is dialed—mobile or fixed—or to the called party's voice mailbox. No international calls are implicated.

Home-like user experience—When forwarding the call to the voicemail, the application makes the original called number and calling party's number available to the voicemail system. This in turn ensures a positive user experience, both for the subscriber and the caller.

Increased call completion rate—Without international call rates, late call forwarding, while roaming, helps callers complete more calls and encourages subscribers to activate their voicemail for message deposits, thereby further increasing the call completion rate. This in turn increases the number of voicemail retrieval calls and callbacks.

No dependencies on visited network—various of the embodiments presented herein do not require any coordination or interoperability with the visited networks. A single solution at the home network suits all visited networks.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
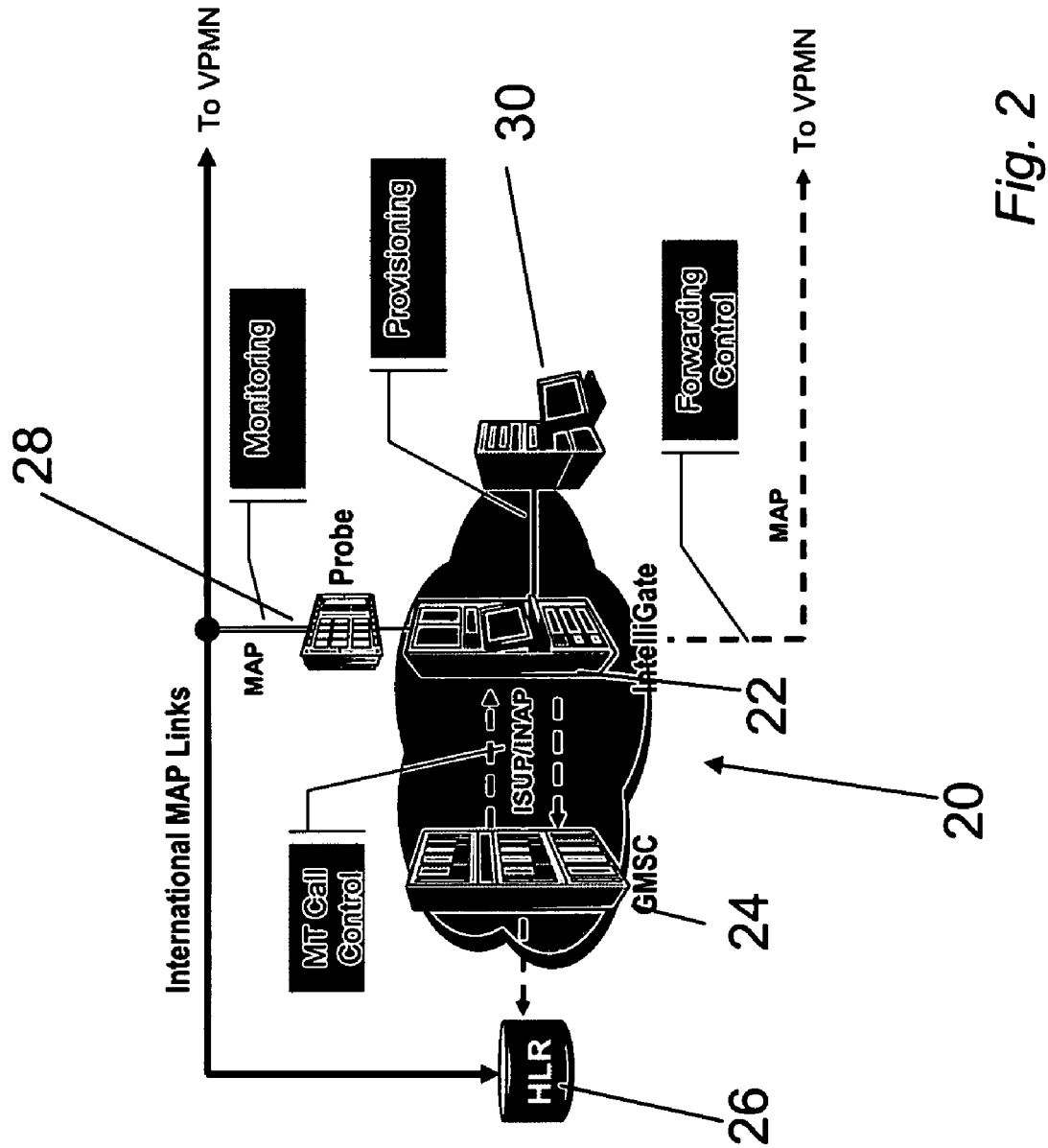
FIG. 2 is a simplified diagram showing a system architecture to which the present embodiments may be applied.

Reference is now made to FIG. 2, which illustrates the generalized architecture of an optimal voicemail deposit system according to a first preferred embodiment of the present invention. A home network 20 includes a roaming gateway or Intelligate 22. Gateway Mobile Switching Centre (GMSC) 24 provides an edge function within the home cellular network, and terminates the PSTN (Public Switched Telephone Network) signalling and traffic formats and converts this to protocols employed in mobile networks. For mobile terminated calls, it interacts with Home Location Register 26 to obtain routing information that is to say to locate the mobile telephone required and communicate with it. In the case of International roaming, the HLR is being used to find the roaming network.

The Optimal Voicemail Deposit system can be integrated with the operator's network via the GMSC 24 in one of the following two ways, essentially two signaling methods:

Intelligent Network (IN), including CAMEL
ISUP (Service Node)

Based on these two alternative signaling methods, the present embodiments provide a generic technical solution for the service. The final delivered solution to the operator however, is preferably adjusted to the specific network configuration and parameters, such as: network size and topology, traffic volume, INAP vendor's variant, CAMEL version—if relevant and to the operator's preferences. All these parameters are usually discussed prior to specifying the final technical solution.

Figure 3:
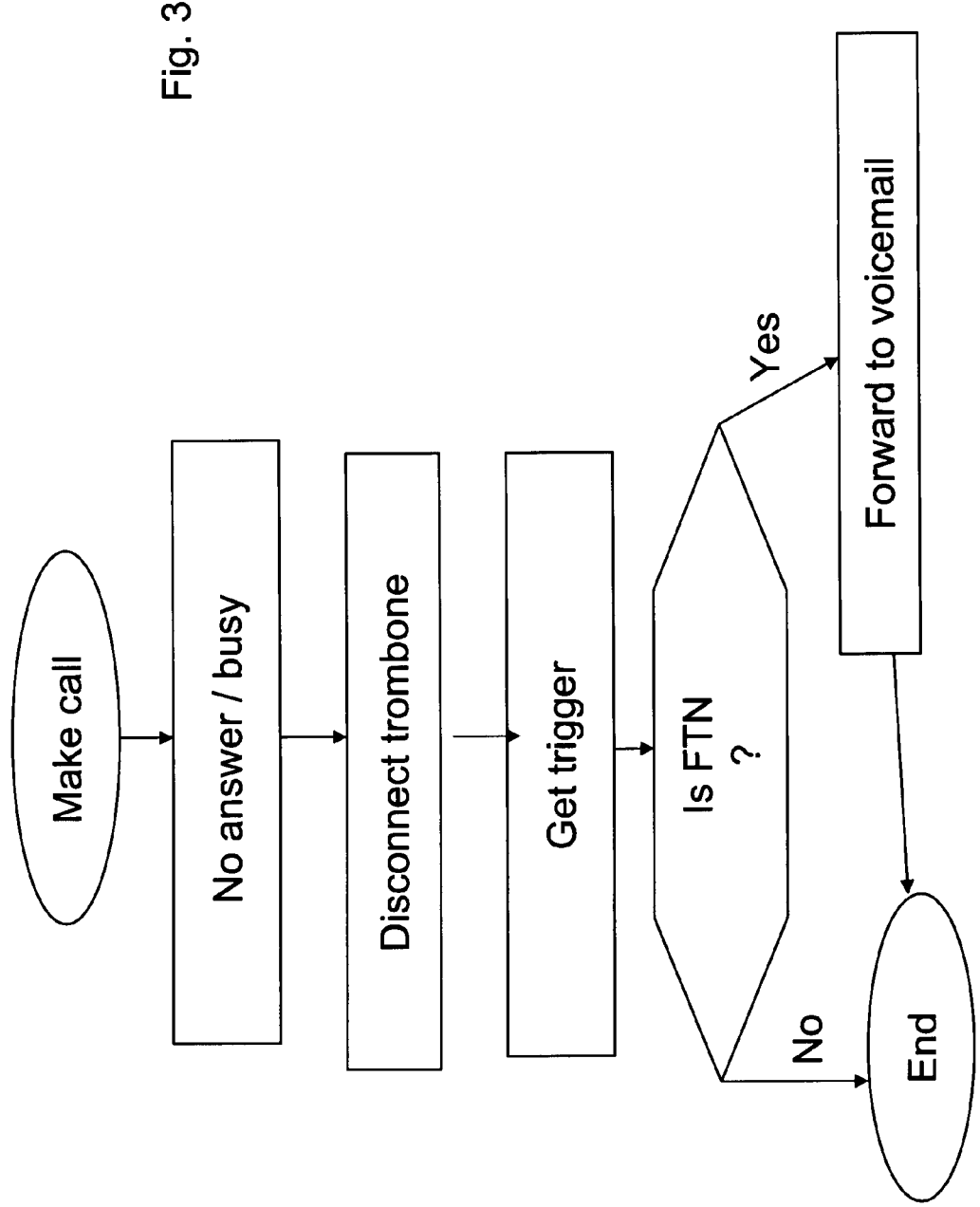
FIG. 3 is a simplified flow diagram illustrating the process of voicemail deposit according to a first preferred embodiment of the present invention.

Reference is now made to FIG. 3 which is a simplified flow chart showing OVMD in action. A call is placed and not answered. The solutions discussed herein include two stages. A first stage involves disconnecting the trombone and the second involves obtaining a trigger. In the following are provided four methods for obtaining a trigger, and then three methods for disconnecting the trombone. The issue of disconnecting the trombone and obtaining the trigger may be considered separately. The disconnecting of the trombone can be either by capturing the call with the VM deposit number, or by operating in association with the FTN (Forward-To-Number), as described in greater detail below.

A first solution for obtaining a trigger is simply to provide a double trigger. The DP12 trigger is the trigger provided by the IN for an MT (Mobile Terminated) call. The DP12 trigger is used by the prepaid system if the MT is directed to a roaming subscriber. Double triggering is possible at the local MSC based on the ability of the switch at the home network to send the trigger twice, which is to two different addresses. The idea is that one address used is the prepaid feature or any other feature needed by the specific user, and the second address is the anti-tromboning feature which is described in greater detail elsewhere herein. The anti-tromboning feature once triggered is able to cut the International links and forward the caller directly to the voicemail as necessary.

In fact, the double trigger may be intended as part of the CAMEL system for inbound roamers. The present system for the first time utilizes the trigger for outbound roamers. However, the double trigger solution does not have to be CAMEL. The switch need only have Intelligent Network (IN), with double triggering support. Double triggering support includes a prefix that can be added after the first trigger, in order to process the second trigger.

A difficulty with the double trigger solution is that it is not widely available, in that many switches are unable to produce a roaming trigger that can be directed to two addresses. A comprehensive solution utilizes the double trigger where available but requires other solutions for other cases.

A second solution uses a software or firmware entity referred to as a broker. A broker can be provided as part of the Intelligent Network IN system for cellular networks. This is referred to hereinbelow as the IN service broker. A regular trigger is used, and the broker is provided as the single address by the trigger. The broker receives the trigger and looks at the service profile for the associated callee. Based on the callee the broker then decides what to do with the trigger. If the user is a prepaid user then the broker sends its own trigger to the prepaid system, and the broker retains the ability to trigger the anti-tromboning and voicemail deposit.

The caller profile can be used to allow a range of features for the roaming user, in that the profile allows the broker to make a decision which is as simple or complex as necessary to trigger any combination of services for the roaming user. A prepaid user would automatically have a trigger provided to the prepaid system but users in general could have triggers provided to any IN services relevant for the current call.

A third solution makes use of call status triggers. A set of what may be termed late call triggers, because they occur after the call has begun, may be used. Such triggers include the "no answer" notification, the "busy" notification etc. The call goes to the prepaid system in the normal way using the roaming trigger. Likewise the call is forwarded to the callee, who does not answer etc. The no-answer status returns to the home network, which can now be used to trigger the anti-tromboning system, and direct it to disconnect the International branch of the call at the gateway, and forward the caller directly to the voicemail.

A busy notification may likewise be used as a trigger for the anti-tromboning feature. The busy trigger also reaches the home network.

In either case, on receipt of the notification, the system has to determine if there is a voicemail to forward the call to. The voicemail is defined by a forward to number (FTN). In fact it should be noted that users on many systems are free to define other numbers to which their calls can be forwarded, not just voicemail, and the present embodiments encompass forwarding of calls to these numbers as well. The FTN is obtained from the home location register (HLR) of the callee. If there is no FTN defined then the call is disconnected. It is noted that a call being forwarded to a voicemail includes a notification in its header that it is for voicemail. Thus the very presence of a call with a voicemail deposit notification in its header may be used to trigger the anti-tromboning feature. As above, once triggered, the anti-tromboning feature may disconnect the International call and subsequently allow connection of the caller to the callee's voicemail. The anti-tromboning feature is responsible for the trombone disconnect, but it is noted that the forwarding to the voicemail is done by another component, the component that receives the trigger, checks the FTN and then decides if or where to route the call.

In general, when a call is forwarded back to the home network with a voicemail notification, and disconnected by the anti-tromboning feature, then a TDP13/14 trigger at the MSC enquires what to do with the call. As long as the TDP13 is answered within a certain time delay then the call can be handled. If not then the call is cut off. It is added that some roaming network switches do not release the call on time. A workaround can be provided by playing a ring back tone from the Intelligate. The ring back tone operates to prevent the home MSC from disconnecting the call until the release trigger is received from the visited network.

Summarizing the $3^{rd}$ method, the call is routed to the mobile handset. If the handset is busy or does not answer, then the call is forwarded to the FTN destination, which is typically a voicemail. Then the International leg of the call that reaches the voicemail is disconnected. At that point, the TDP 13/14 trigger arrives at the roaming gateway or Intelligate, asking what to do. As mentioned above, there are two main steps involved, firstly disconnecting the trombone, and secondly obtaining the trigger.

A fourth method is based on Standard Optimal Routing (SOR), otherwise referred to as standard-based late call forwarding. SOR is the optimal routing system defined in the GSM standard that was always intended to avoid the existence of tromboning. Standard optimal routing is supported by certain International switches, particular those provided by Ericsson. Such optimal routing typically only works if the switches at both networks have SOR support and this is rare.

The ETSI/3GPP standard 23.079, the contents of which are hereby incorporated by reference, provides the description for the optimal routing of late call forwarding, using the Support of Optimal Routing (SOR) feature. This standard solution requires interoperability between the home network or HPMN and the visited network or VPMN, in order to provide the service. The present solution eliminates the need for such cooperation between the home network and each one of the visited networks. Such cooperation has not happened so far, due to the complexity of upgrading the network components to support this feature, and the requirement of having agreements to be signed with all visited networks or a portion of them.

The present solution comprises placing apparatus at the home network which emulates SOR functions. If the roaming network has SOR then the roaming network simply produces the necessary signals to provide optimal routing and allows the home network to respond to these signals. The apparatus is not required to do anything when the roaming network has SOR. If, on the other hand, the roamer is in a network without SOR support, then the apparatus sends to the home network signals that simulate the roamer having SOR. In essence the apparatus serves as a home network based SOR emulator, for providing the SOR signaling that the roaming network should be providing but does not. Upon receipt of this signaling the home network is able to connect the caller directly to the voicemail. Equipped with such apparatus the home network sees all roaming networks as having SOR support.

It is noted that in the above solution, the home network has SOR capability. However for the present solution the SOR feature need only be activated in the HLR and the GMSC. SOR does not need to be activated in all of the MSCs, as it would be in the general SOR solution. The method is described in greater detail hereinbelow, where it is explained how probes can be used by the emulator for it to obtain the information it needs in order to carry out the emulation.

The solution relies on the Intelligate, with the following interfaces to the HPMN's network, as will be explained in greater detail below:
  SCCP relay (PRN & PRN ACK messages) or an SS7 probe
  INAP/ISUP There now follows a description of three methods for disconnecting the trombone.

The first way to disconnect the trombone is to capture the call according to the voicemail deposit number. The second is simply to cancel the FTN, either through the HLR, or through the roaming gateway, by sending a new ISD profile to the VLR. An ISD profile is the subscriber profile stored in the HLR and downloaded to the current VLR, using the MAP Insert Subscriber Data message.

Canceling the FTN preferably causes the first international leg to disconnect without creating the tromboning in the first place.

A third way to disconnect the trombone comprises setting a CAMEL trigger to the subscriber, at the roaming VLR. In that case, the roaming gateway or Intelligate receives a trigger before setting the second leg to the voicemail or the FTN. In this case a trigger is obtained before the disconnect occurs, but then the TDP 13/14 trigger is obtained later on, after the disconnect. In all the above three methods, the TDP 13/14 trigger is received after the trombone disconnects. In fact, the same applies to the other methods explained herein including the TDP12, the IN service broker, and the SOR, the latter of which is explained below.

In the following is a description of the two signaling options referred to above, IN and ISUP.
  Intelligent Network (IN)—Including CAMEL Using the IN architecture, the IntelliGate 22 controls mobile terminated calls delivered to outbound roaming subscribers. The IN solution suits networks that are already IN or CAMEL ready, that is IN or Camel compatible, and/or networks that experience relatively high outbound roaming traffic.

Using INAP or CAP protocols, call control is performed using a combination of Trigger Detection Points and Event Detection points.
  ISUP—Including Loop Around In particular cases—such as: a non-IN network environment, cases where there is relatively low outbound roaming traffic, or, when specifically requested by the operator, call control is performed using ISUP signaling—In this case all MT roaming calls are physically routed to the Intelligate platform. The Loop Around method is a much better method, where only the ISUP signaling is routed to the Intelligate, while the physical voice part actually stays on the MSC. This is achieved by connecting the E1/T1 lines back to the MSC, creating a physical loop. This method avoids the transfer of the huge amount of voice traffic to the Intelligate, by having a "semi IN" solution.
GSM-MAP Using GSM-MAP, the IntelliGate automatically deactivates the forwarding settings of roaming subscribers in the visited network, when registering to a foreign network, as well as when returning to the operator's network. It should be noted that in some networks the deactivation of the FTN for a roamer is performed by the network. The IntelliGate can use this network feature and provide a complete service
Probe Interface Referring again to FIG. 2, Intelligate 22 typically comprises an SS7 Mobility Probe 28 to monitor International signaling links. Thus, the IntelliGate is connected to the operator's international SCCP signaling links in a completely passive mode.

The probe interface obtains for the OVMD from the signaling links the relevant subscriber information, such as the MSISDN and the forwarding-to-number (FTN) referred to above.

It is noted that in many networks, the OVMD service can be implemented without using a probe and probe interface to monitor the signaling links.

Provisioning Interface

The application provides a provisioning interface 30 to enable the management of application parameters and subscriber lists. For example OVMD may be a restricted service, available only to certain subscribers, say those who have complained in the past about tromboning, and the operator may allow the provisioning of IMSI/MSISDN numbers of those subscribers who are entitled to use the Optimal Voicemail Deposit service (white list).

Service Structure and Processes

Considering FIG. 3 again and the service comprises the two separate logical parts of disconnecting the trombone and receiving a trigger which enables the local routing to a voicemail (or another preferred FTN) or call disconnect The different embodiments discussed herein may be mixed and matched in whatever way is most appropriate to provide a highly customizable solution to support different networks and constellations of networks in terms of diverting calls to voicemail as well as in releasing the forwarded trombone.

Methods for Releasing the Trombone

Above was discussed in general terms the issue of releasing the trombone. One of the alternatives for releasing the trombone is explicitly to release the returning leg of the trombone.

A set of methods for releasing the returning leg of the trombone waits until the forwarded call returns from the visited network and only then releases the call, thus causing the release of the trombone.

ISUP/INAP Trigger at GMSC to IntelliGate

In one method, a routing rule/IN trigger is defined in the GMSC 24 for all incoming calls from abroad with a specific DN value. The DN value would be a pointer to the Voicemail Deposit number, and the trigger is handed to the IntelliGate 22. The Intelligate 22 then releases the call.

By GMSC

Another method is similar to the above. However, instead of triggering the IntelliGate 22 the GMSC 24 itself has the capability of releasing those calls. To provide the GMSC with such an ability, a special patch may need to be installed in the GMSC.

SCCP Relay

Yet a further method intercepts CAMEL O-CSI triggers coming from the visited network before the trombone occurs and releases the mobile-forwarded calls, thus causing the trombone to be released. It will be appreciated that such a method requires the visited network to produce such triggers.

Suppression of FTN while Roaming.

One method to prevent tromboning is to suppress the FTN and such suppression may be carried out in a number of ways including the following.

By HLR

The FTN may be suppressed by the HLR 26. A feature in the HLR that causes the HLR not to send the FTNs is the MAP_ISD message that is used when the subscriber is roaming.

By Probe & Additional ISD

Another method for suppressing the FTN relies on the IntelliGate 22 monitoring MAP_ISD messages sent by the HLR 26. After each MAP_ISD message is sent by the HLR 26 to the VLR at which the roaming user is located, the IntelliGate 22 issues a consecutive MAP_ISD message in which the FTN is marked as disabled. Such a disablement prevents the VLR, which is at the visited network, from forwarding unanswered calls. Thus the trombone is never formed in the first place.

Maximum Redirection Counter

A further method is applicable when the IntelliGate 22 itself handles mobile terminated (MT) calls before they leave the home network 20, also referred to as the HPMN. The method involves DP12 redirection using the redirection counter field of an initial address message (IAM). When the call is sent to the visited network, IntelliGate 22, which is handling the call, is able to place a maximum value in the redirection counter field in the IAM message.

It is noted that due to inconsistency in International carrier behavior the redirection parameter is sometimes omitted on the way.

Methods for Forwarding Unanswered Calls to Voicemail

The OVMD preferably includes a variety of methods for diverting unanswered calls to the voicemail (or other destinations). Due to the variance between mobile networks, each solution may best suit specific networks, and a complete package preferably includes multiple options.

The following describes several possibilities for providing late call forwarding without international tromboning. The offered solutions have been outlined above and can be divided into two groups of solutions:

1. IN-based solutions
    a. Double Triggering on DP12
    b. IN Service Broker for DP12
    c. Call status triggers such as "call busy" or "no answer"
2. NSS-based solution
    a. Standard-based late call forwarding Double Triggering on DP12

Figure 4:
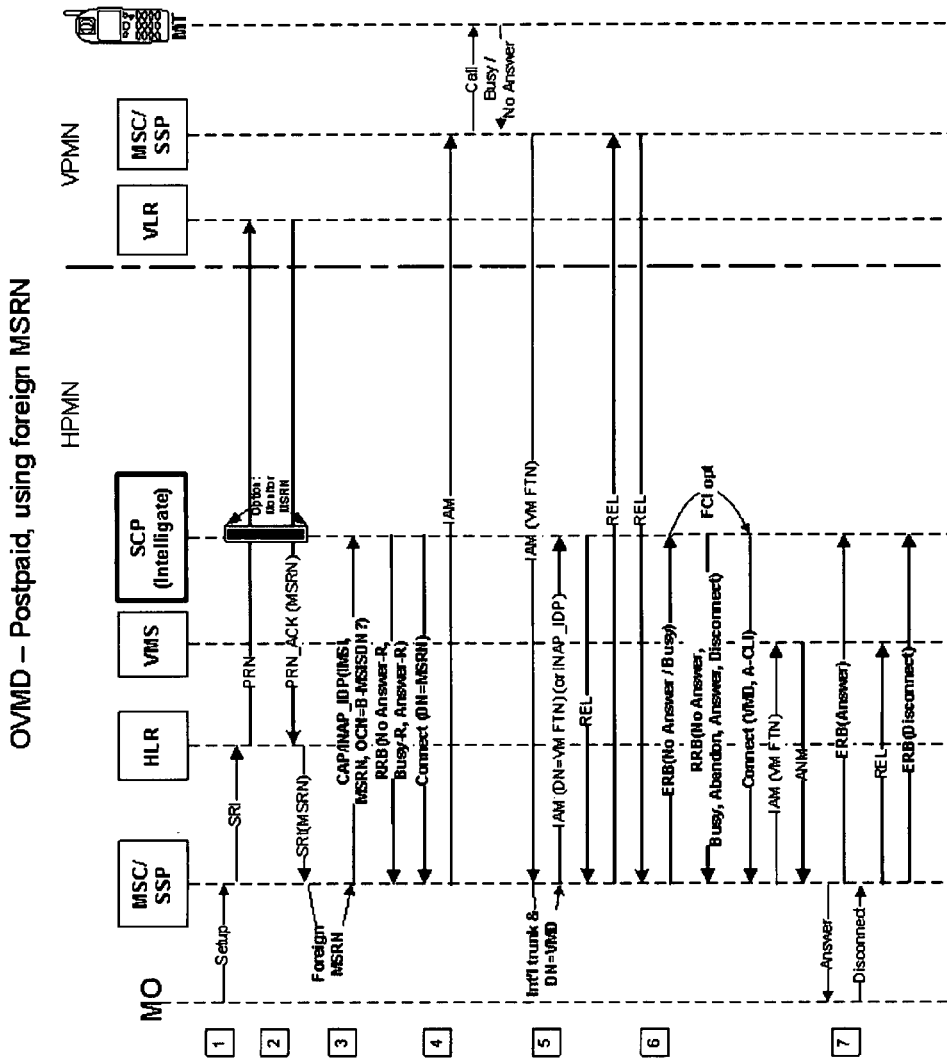
FIG. 4 is a simplified service flow chart showing optimal voicemail deposit for a postpaid user, according to a preferred embodiment of the present invention based on double triggering.

Reference is now made to FIG. 4 which is a schematic diagram illustrating a solution based on the capability of an MSC to trigger two different SCPs, one using CAP and the second using INAP.

The first trigger, that using CAP, is rerouted to the IntelliGate 22 by using a GT translation rule in the STP and the IntelliGate 22 responds with a CAP-Connect message with a predefined prefix on the directory number (DN) to activate the second trigger in the MSC based on this prefix.

Postpaid Call Flow based on a foreign mobile station roaming number (MSRN) is illustrated in the figure and the flow is explained according to table 1 below.

TABLE 1

Postpaid User with Foreign MSRN

| Step | Description |
|---|---|
| 1 | Mobile terminated (MT) call reaches the GMSC.<br>GMSC sends SRI message, HLR sends a PRN to the VLR to obtain the roamer's MSRN. |

TABLE 1-continued

Postpaid User with Foreign MSRN

| Step | Description |
|---|---|
| 2 | IntelliGate may be required to monitor the MAP-PRN and MAP_PRN_ACK messages in order to be able to correlate between the MSRN and B-Party MSISDN, in case B-MSISDN is omitted from the trigger in step #3. |
| 3 | Based on the foreign MSRN value the GMSC triggers the IntelliGate. |
| 4 | IntelliGate responds with a Connect to the MSRN and the call is sent to the visited network |
| 5 | After the roamer has not answered the call (or busy, or not reachable) the call is forwarded back to the Voicemail Deposit number. A second trigger is defined on the GMSC for all calls coming from abroad with DN = VoicemailDeposit to be sent to the IntelliGate. IntelliGate releases the call, causing the trombone to be released. |
| 6 | When the release on the first international leg reaches the GMSC, it issues an ERB message to the IntelliGate which sends a connect message to divert the call to the voicemail. |
| 7 | The voicemail answers the call and A-Party deposits a message. |

Prepaid Roamer in a CAMEL Enabled VPMN

Figure 5:
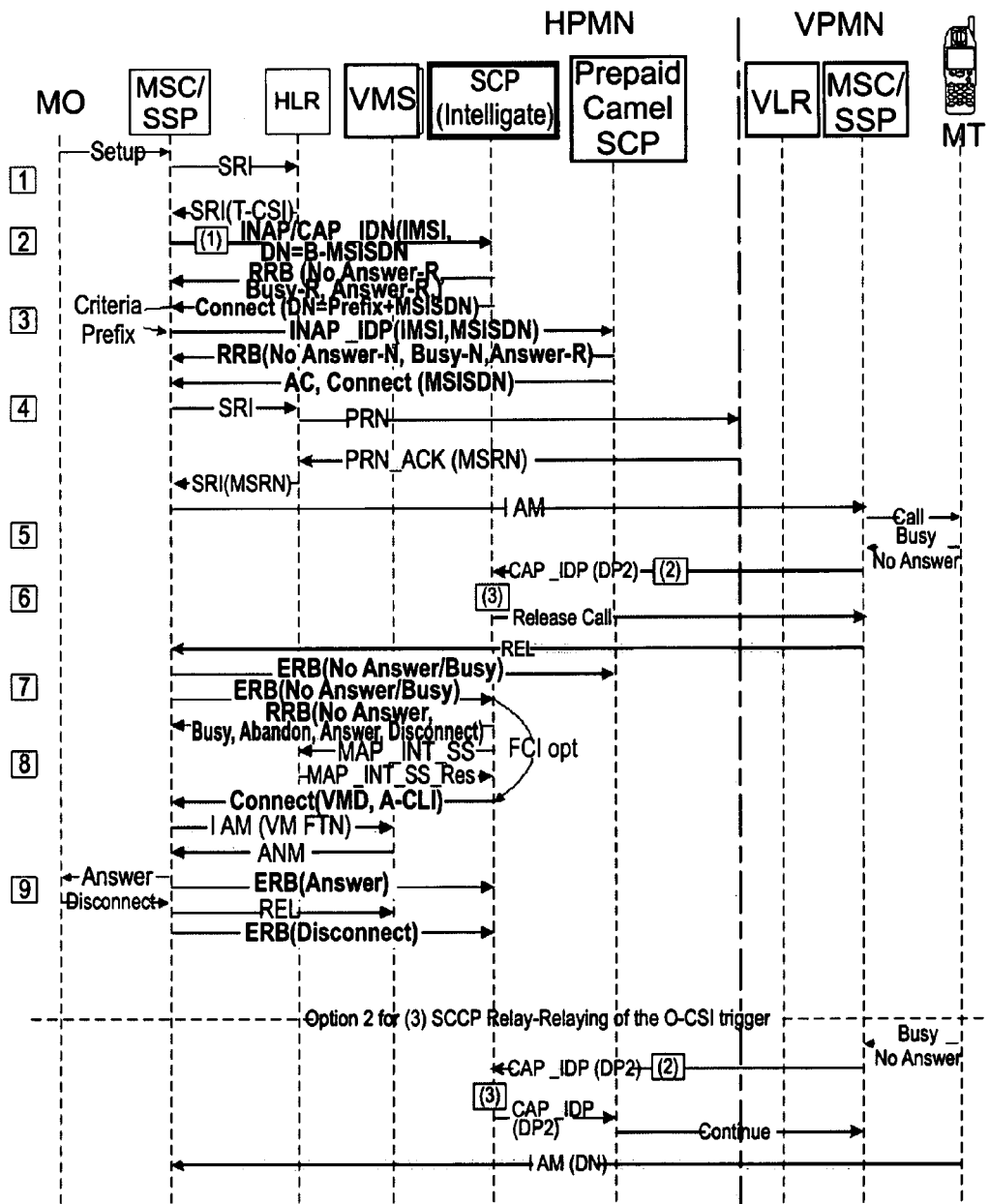
FIG. 5 is a simplified service flow chart showing optimal voicemail deposit for a prepaid user in a Camel enabled roaming network, according to the double triggering embodiment of FIG. 4.

Reference is now made to FIG. 5 which is a schematic diagram illustrating the process flow when a prepaid roamer is roaming in a roaming network (VPMN) which is Camel enabled. In such a case the Camel provided IDP trigger may be used. FIG. 5 is explained with reference to table 2 below.

who is roaming in a network which is not Camel enabled. In this case the double triggering method referred to above is used based on adding a prefix to the DN value. The flow is explained with reference to Table 3 below. It is noted that while the visited network is not Camel enabled, the home network may be, and the case illustrated is that in which the home network is Camel-enabled.

TABLE 2

Prepaid Roamer in Camel enabled visited network

| Step | Description |
|---|---|
| 1 | MT call reaches the GMSC. GMSC sends SRI message, HLR sends the terminating trigger indication and the VLR# |
| 2 | The GMSC initiates an IDP message towards the Prepaid SCP. Based on a GT routing rule (SCCP) in the STP (1), the trigger is rerouted to the IntelliGate, which responds with an RRB and a Connect message with a prefix added to the DN value. |
| 3 | Based on the prefixed DN the GMSC issue a second INAP trigger and sends an IDP to the Prepaid SCP |
| 4 | A second MAP_SRI message is sent to the HLR, which sends a MAP_PRN to the VLR |
| 5 | The call is sent to the visited network based on the roamer's MSRN. |
| 6 | When the roamer does not answer the call, the visited network sends a CAMEL_IDP towards the prepaid system to acknowledge the Mobile-Forwarded call. The O-CSI_IDP is again rerouted based on GT routing rule (SCCP), to the IntelliGate. The IntelliGate checks if this is a MF call, if yes, it releases the call. NOTE: if this is a regular MO call, IntelliGate relays the message to the Prepaid SCP (Actual GT) for further handling. Please refer to Option 2 in the diagram above. |
| 7 | After the trombone has been released the GMSC sends an ERB to the Prepaid SCP, and a second ERB to the IntelliGate |
| 8 | Using MAP_INTERROGATE_SS the IntelliGate retrieves the forward-to-numbers (FTN) before diverting the call to the requested destination |
| 9 | The Voicemail answers the call and the caller (A-Party) can deposit a message |

Prepaid Roamer in a Non CAMEL VPMN

Figure 6:
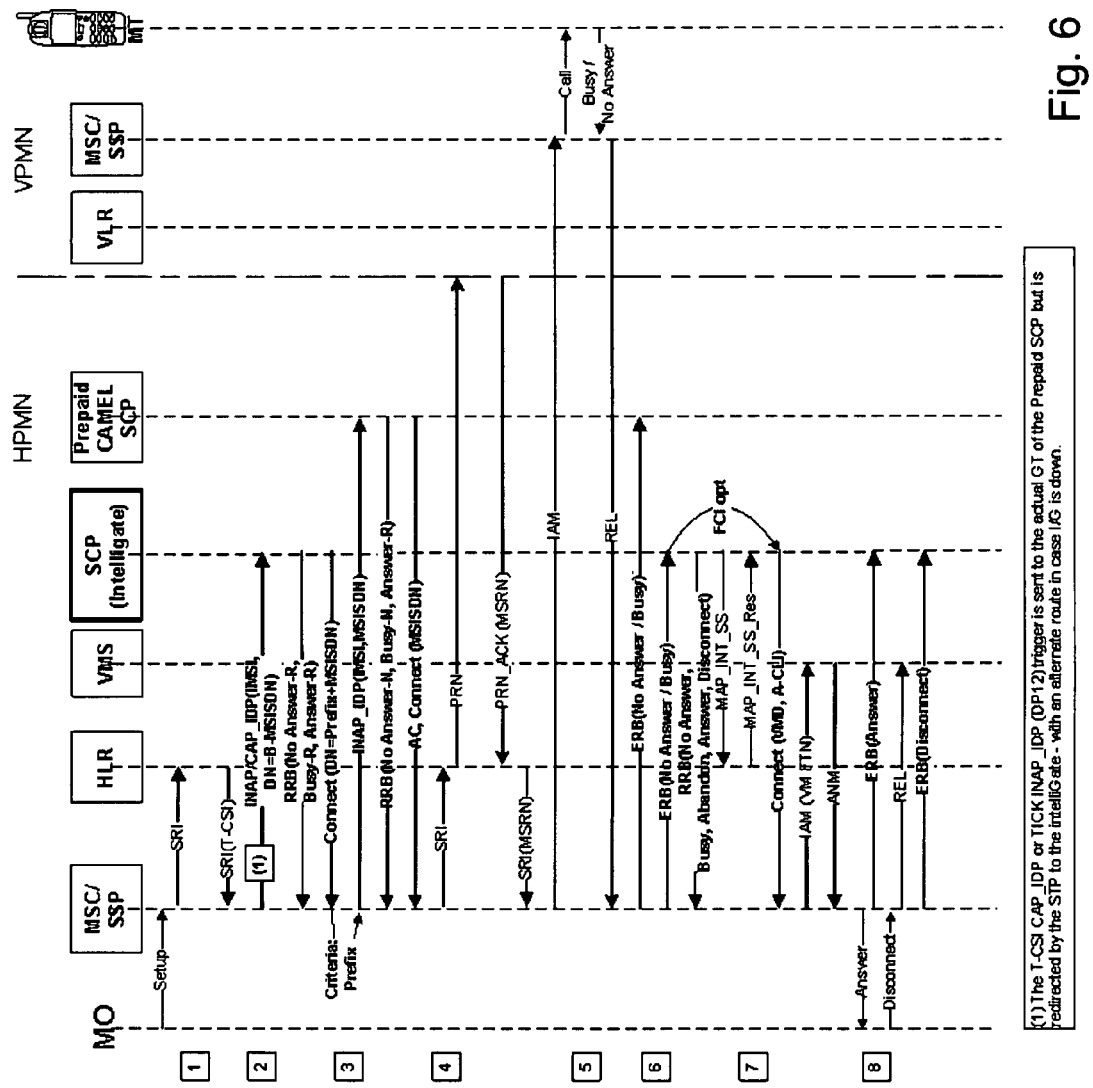
FIG. 6 is a simplified diagram showing double triggering for a prepaid roamer in a non-Camel enabled network, according to the embodiment of FIG. 4.

Reference is now made to FIG. 6, which is a simplified schematic diagram illustrating the case of the prepaid roamer

TABLE 3

Prepaid user at a non-Camel enabled roaming network.

| Step | Description |
|---|---|
| 1 | MT call reaches the GMSC. GMSC sends SRI message, HLR sends the terminating trigger indication and the VLR# |
| 2 | The GMSC initiates an IDP message towards the Prepaid SCP. Based on a GT routing rule (SCCP) in the STP (1), the trigger is rerouted to the IntelliGate, which responds with an RRB and a Connect message with a prefix added to the DN value. |
| 3 | Based on the prefixed DN the GMSC issue a second INAP trigger and sends an IDP to the Prepaid SCP |
| 4 | A second MAP_SRI message is sent to the HLR, which sends a MAP_PRN to the VLR |
| 5 | The call is sent to the visited network based on the roamer's MSRN. |
| 6 | When the roamer does not answer (or Busy, or not reachable) the visited network releases the call. Once the release message reaches the GMSC it sends an ERB to the prepaid SCP and a second ERB to the IntelliGate |
| 7 | Using MAP_INTERROGATE_SS the IntelliGate retrieves the forward-to-numbers (FTN) before diverting the call to the requested destination (Connect(VMD)) |
| 8 | The Voicemail answers the call and the caller (A-Party) can deposit a message |

Service Flow Using IN Service Broker

Figure 7:
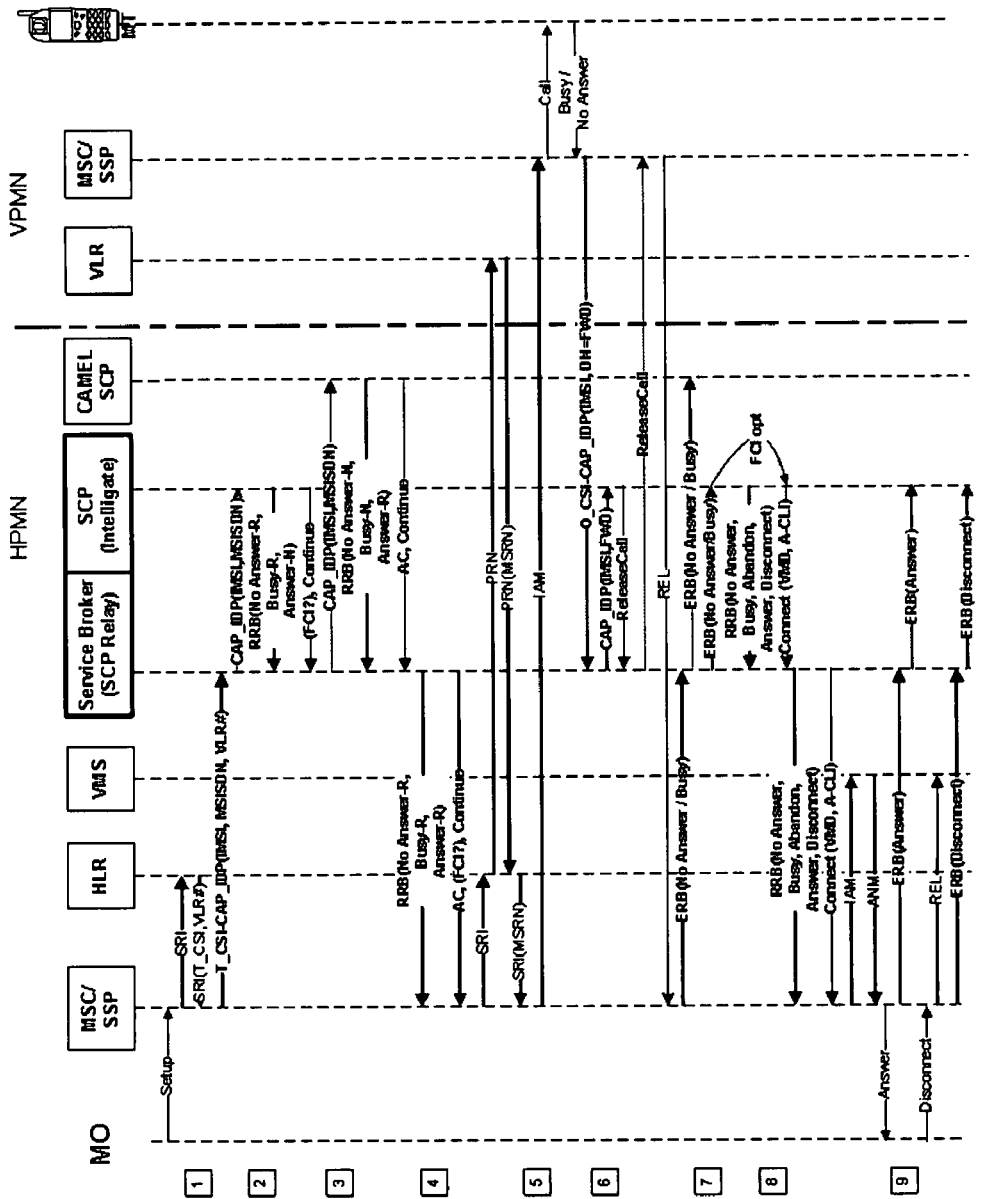
FIG. 7 illustrates the service flow for a prepaid user in a Camel enabled roaming network according to a preferred embodiment of the present invention based on an IN service broker.

Reference is now made to FIG. 7, which is a simplified diagram illustrating the service flow for a prepaid user in a Camel-enabled visited network where an IN service broker is used as the initial target of a trigger. In many cases a subscriber can have only one subscription-based trigger in the HLR. This means that in theory a subscriber can have only one application in the network that can be triggered. That is to say only one SCP can obtain the trigger. The purpose of having an IN Service Broker component in a network is to receive the trigger and then send out multiple triggers based thereon. In other words the broker can split the single trigger into multiple SCPs to be able to provide multiple services with a single subscription trigger.

As the DP12 trigger is already taken for prepaid mobile-terminated calls while roaming, an IN Service Broker can be used in order to allow another service such as Optimal Voicemail Deposit for prepaid roamers to share the same DP12 IN trigger. In the following are discussed the call flows of the service when an IN Service Broker is in use.

It is noted that the service broker is totally separated from the OVMD Service, logically and even physically.

FIG. 7 illustrates the call flow for a prepaid roaming user in a CAMEL enabled VPMN, and shows the use of the IN service broker to provide two triggers. The call flow is explained in table below.

TABLE 4

Prepaid Roamer in Camel enabled visited network using IN service broker.

| Step | Description |
|---|---|
| 1 | MT call reaches the GMSC. GMSC sends SRI message, HLR sends the terminating trigger T-CSI indicator and the VLR# |
| 2 | The T-CSI IDP is sent from the GMSC to the Service Broker. NOTE: The actual GT address of the IDP can be the prepaid SCP but the message should be rerouted by the STP to the Service Broker, hence providing higher service availability in case of failure in the Service Broker |
| 3 | The Service Broker sends an IDP message to the first SCP - IntelliGate, and afterwards to the second SCP - prepaid SCP. |
| 4 | An Accumulated response is sent from the Service Broker to the GMSC with all requests joined from all Back-end SCPs IntelliGate and Prepaid system) |
| 5 | A second MAP_SRI is sent to the VLR to get the MSRN. The call is sent to the visited network. |
| 6 | When roamer does not answer, an O-CSI trigger for the forwarded leg is sent to the SCP. A routing rule in the STP reroutes the trigger to the IntelliGate/Service Broker. When the IntelliGate gets the trigger it releases the call, thus releasing the trombone |
| 7 | When the release message arrives, the GMSC sends an ERB message to the Service Broker, which sends an ERB to the prepaid system (to close the charging session) and to the IntelliGate. |
| 8 | The IntelliGate diverts the call to the Voicemail Deposit number |
| 9 | A-Party deposits a message. |

Prepaid Roamer in Non CAMEL VPMN

Figure 8:
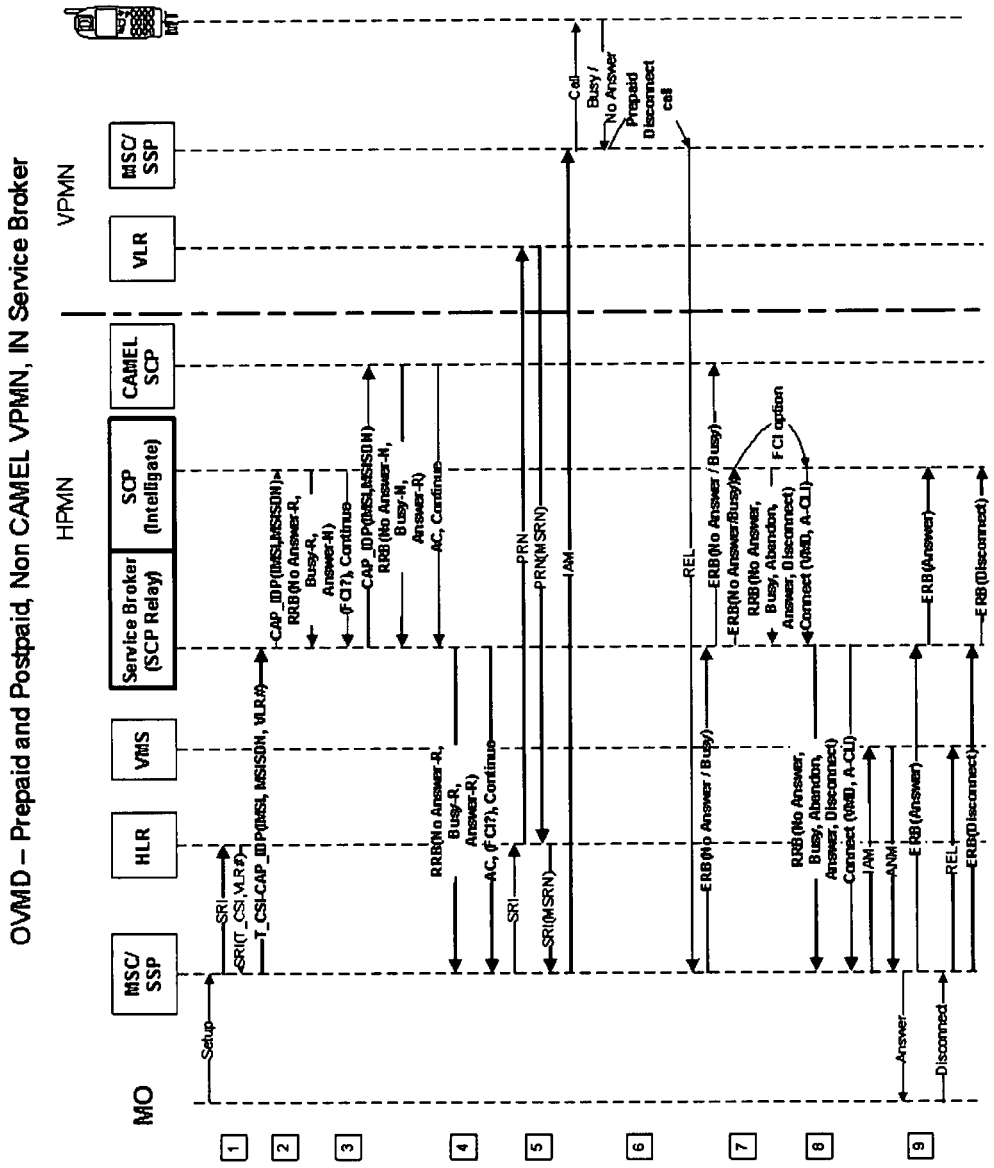
FIG. 8 illustrates the service flow for a prepaid user in a non-Camel enabled network according to the IN service broker embodiment of FIG. 7.

Reference is now made to FIG. 8, which is a simplified diagram illustrating the case of the use of an IN service broker for a prepaid roaming user located in a roaming network which is not Camel enabled. The flow is explained in Table below.

TABLE 5

Roaming user in non-Camel roaming network with use of IN service broker.

| Step | Description |
|---|---|
| 1 | MT call reaches the GMSC. GMSC sends SRI message, HLR sends the terminating trigger T-CSI indicator and the VLR# |
| 2 | The T-CSI IDP is sent from the GMSC to the Service Broker. NOTE: The actual GT address of the IDP can be the prepaid SCP but the message should be rerouted by the STP to the Service Broker. This shall provide higher service availability in case of failure in the Service Broker |
| 3 | The Service Broker sends an IDP message to the first SCP - IntelliGate, and afterwards to the second SCP - prepaid SCP. |
| 4 | An Accumulated response is sent from the Service Broker to the GMSC with all requests joined from all Back-end SCPs IntelliGate and Prepaid system) |
| 5 | A second MAP_SRI is sent to the VLR to get the MSRN. The call is sent to the visited network. |
| 6 | When the call is not answered, it is released because the VPMN has no CAMEL relationship with the HPMN. |
| 7 | When the release message arrives, the GMSC sends an ERB message to the Service Broker, which sends an ERB to the prepaid system (to close the charging session) and to the IntelliGate. |
| 8 | The IntelliGate diverts the call to the Voicemail Deposit number |
| 9 | A-Party deposits a message. |

Service Flow Using INAP/CAP Call Status Triggers ("Such as "Call Busy" or "no Answer")

In the following are described different service flows for the methods based on making use of the call status triggers as outlined above. Specifically, use is made of INAP/CAP call status triggers, such as the triggers for "call busy" or "call not answered". By using these triggers, the service overcomes the conflict with other services that use the TDP12, such as: Prepaid, Call Screening, VPN, etc services. The system is based on the TDP 13 and TDP 14, that is the busy and no answer triggers respectively.

Figure 9:
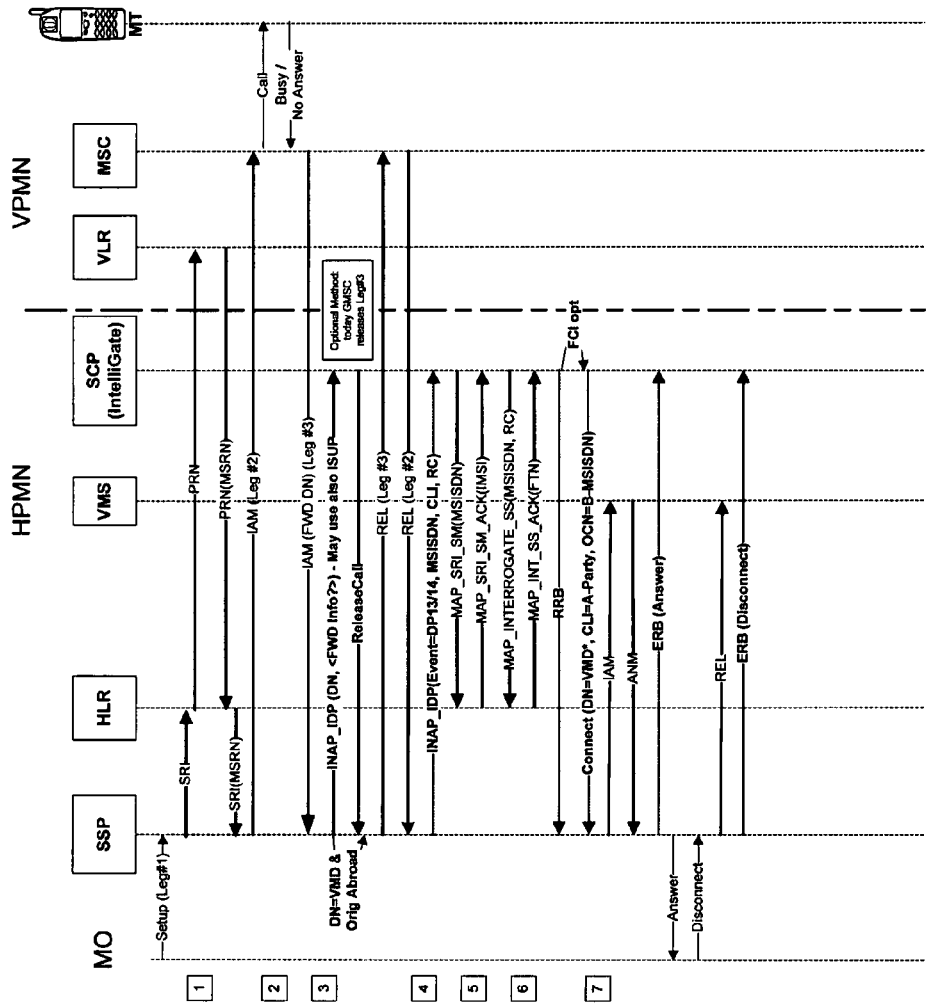
FIG. 9 is a simplified service flow diagram for a postpaid user in either a Camel enabled or non-enabled visited network, according to a preferred embodiment of the present invention in which call status triggers are used.

Reference is now made to FIG. 9, which is a simplified diagram illustrating the service flow when the roamer is a postpaid user. The flow is explained with respect to table 6 below.

TABLE 6

Call Termination Triggers with Postpaid User.

| Step | Description |
| --- | --- |
| 1 | MT call reaches the GMSC.<br>GMSC sends SRI message, HLR sends a PRN to the VLR to get the roamer's MSRN |
| 2 | The GMSC sends the call to the visited network using the MSRN |
| 3 | The GMSC triggers the IntelliGate for all calls from abroad with DN = Voicemail Deposit (VMD) number. The forwarded leg causes the GSMC to trigger the IntelliGate. The IntelliGate releases the forwarded leg causing the release of the voicemail trombone. |
| 4 | When the mobile-terminated call is released without answer, a TDP13(Busy) or TDP14(No Answer) situation is raised in the SSP, causing the SSP to trigger the IntelliGate with the relevant call details - B-MSISDN, CLI, Release Cause. |
| 5 | MAP_SRI_SM is used for translating the MSISDN to IMSI, this is required for the next step |
| 6 | MAP_INTERROGATE_SS is used to retrieve the Forward-To-Number for the Release Cause |
| 7 | IntelliGate diverts the call to the corresponding destination according to the FTN. |

Prepaid Roamer in CAMEL VPMN Service Flow

Figure 10:
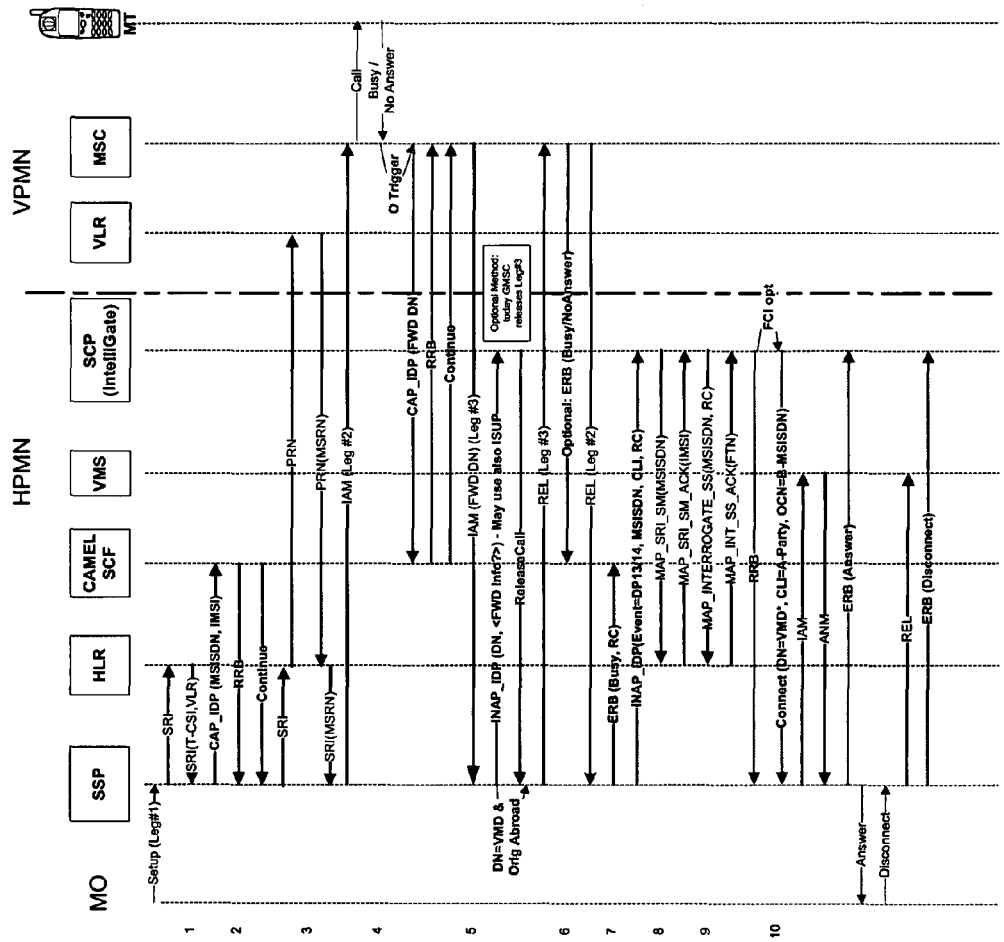
FIG. 10 is a simplified service flow diagram for a prepaid user in a Camel enabled visited network, according to the embodiment of FIG. 9 in which call status triggers are used.

Reference is now made to FIG. 10, which illustrates a variation of the call termination trigger, TD13 and TD14 approach in the case of a prepaid roamer who is roaming in a Camel-enabled roaming network. The flow is explained with respect to table 7 below.

TABLE 7

Call Termination Triggers with Prepaid User, Camel-Enabled roaming network.

| Step | Description |
| --- | --- |
| 1 | MT call reaches the GMSC, GMSC send first MAP_SRI to the HLR and gets the VLR# and T-CSI subscription. |
| 2 | GMSC triggers the prepaid SCP, after processing the SCP responds with RRB, and Continue (or Connect) |
| 3 | GMSC sends second SRI message, HLR sends a PRN to the VLR to get the roamer's MSRN. The GMSC sends the call to the visited network using the MSRN. |
| 4 | When the call is not answered the visited MSC triggers the prepaid SCP (due to O-CSI). The prepaid SCP responds with RRB and Continue (or Connect) |
| 5 | The forwarded leg is sent back home (to the voicemail deposit number). The GMSC is configured to send all calls from abroad with DN = Voicemail Deposit (VMD) number to the IntelliGate, which releases the call, thus releases the trombone. |
| 6 | The release of the forwarded leg causes the visited MSC to send an ERB back to the prepaid SCP. |
| 7 | The release of the mobile-terminated call causes the GSMC to send an ERB to the prepaid SCP. This shall stop the charging session for the roaming MT call. |
| 8 | When the mobile-terminated call is released without answer, a TDP13(Busy) or TDP14(No Answer) situation is raised in the SSP, causing the SSP to trigger the IntelliGate with the relevant call details - B-MSISDN, CLI, Relase Cause. |
| 9 | MAP_SRI_SM is used for translating the MSISDN to IMSI, this is required for the MAP_INTERROGATE_SS which is used to retrieve the Forward-To-Number for the Release Cause |
| 10 | IntelliGate shall divert the call to the corresponding destination according to the FTN. |

Service Flow Using Standard-Based Late Call Forwarding

In the following is described the fourth triggering option outlined above. As explained, GSM includes support for optimal routing (SOR). The following methods are possible when the home network (HPMN) supports the 3GPP standard Support for Optimal Routing (SOR). The home based IntelliGate includes a module that emulates Support for Optimal Routing with all visited networks. That is to say the emulator supplies the signals that the visited network is supposed to supply but usually does not in order to provide optimal routing. As a result of using the emulator the home network sees a universe of neighboring networks which all appear to behave as if they are SOR compatible and thus tromboning can be prevented.

The emulator preferably uses probes that monitor the International signaling links and is thus able to obtain sufficient information to provide the emulation. Typically the emulator uses the SCCP relay module for relaying specific MAP messages before the call is initially routed to the visited network.

Figure 11:
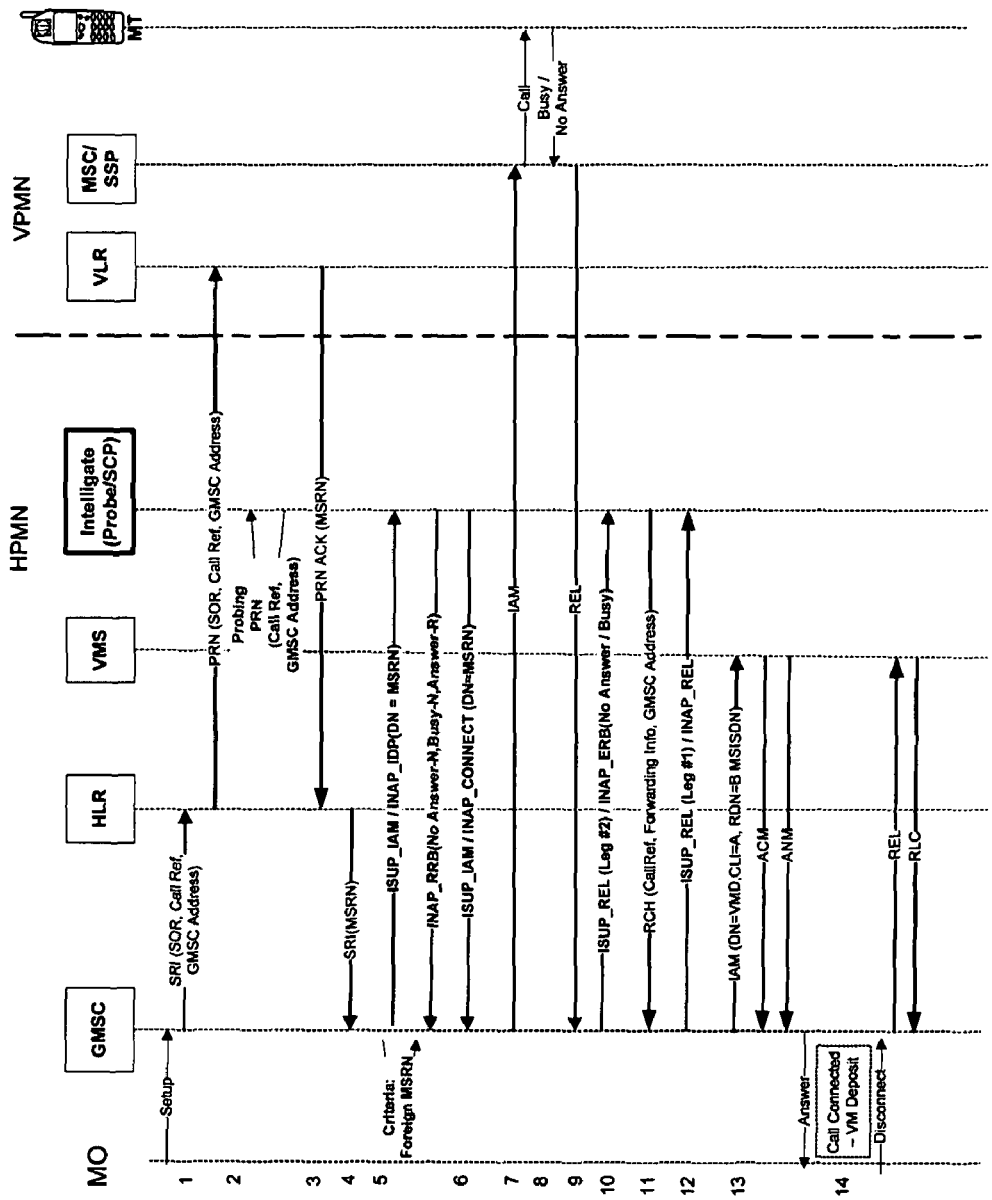
FIG. 11 is a simplified flow diagram for a postpaid roaming user in a non-camel enabled visited network, according to a preferred embodiment of the present invention that uses a SOR emulator based on probes, specifically an SS7 probe.

Reference is now made to FIG. 11, which is a simplified schematic diagram that illustrates the process flow with a SOR emulator that uses probes when a postpaid roaming user is located in a Non CAMEL VPMN that is not SOR compatible. It will be appreciated that if the VPMN is SOR compatible then the emulation does not need to do anything.

TABLE 8

SOR emulation for a postpaid User in non-SOR compatible, non-Camel
Roaming Network, using a regular probe.

| Step | Description |
|---|---|
| 1 | MT call reaches the GMSC.<br>All GMSCs and HLRs of the operator are configured to perform SOR for every MT call by roaming subscribers<br>(by specifying the relevant fields in the Send Routing Information (SRI) and Provide Roaming Number (PRN) MAP messages).<br>GMSC sends SRI message, specifying SOR is requested, the Call Reference and the GMSC Address. |
| 2 | PRN message is sent from HLR to foreign VLR.<br>Foreign VLR, that does not support SOR or does not have a SOR agreement with the HPMN, will simply ignore the SOR indication, and continue (allocate MSRN). |
| 3 | PRN ACK messages returning from foreign VLR are forwarded to HLR.<br>Messages contain the MSRN.<br>Intelligate MAP probe captures the PRN transaction (PRN & PRN Ack), and stores its relevant parameters:<br>IMSI, MSRN, Call Reference & GMSC Address.<br>In addition, same probe is used offline for the registration process (UL & SD messages), and stores relevant information about the subscriber (IMSI, MSISDN, Call Forwarding Information, O-CSI information etc). |
| 4 | SRI with MSRN is returned to the GMSC. |
| 5 | GMSC routes the call towards MSRN.<br>An ISUP routing rule or IN trigger on the GMSC routes the call to the IntelliGate. Criteria is Called Number = foreign MSRN (MT call to roaming destination).<br>IntelliGate receives ISUP_IAM or IN_IDP message. |
| 6 | IntelliGate connects the call towards the original MSRN, by using another ISUP_IAM message or IN_CONNECT.<br>If using IN, IntelliGate arms the relevant DPs (Busy, No-Answer, Answer). |
| 7 | GMSC routes the call towards the MSRN, to the foreign MSC (through international).<br>Call reaches the visited MSC (serving MSC of B Party). |
| 8 | B Party is not reachable/rejects the call/does not answer.<br>In order to prevent the trombone, the forwarded leg must be released, can either:<br>1. Have call forwarding disabled by HLR during registration to the visited network<br>(HLR not sending FTNs in MAP_ISD)<br>2. Let IntelliGate send a following MAP_ISD (with disabled FTNs) after each MAP_ISD sent by HLR<br>3. Leave the call forwarding setting as is, but disconnect the forwarded leg that returns to the HPMN (disconnect is done by IntelliGate to all incoming calls with DN = VM Deposit)<br>4. In CAMEL VPMNs, redirect the O-CSI IDP to the IntelliGate to respond with a IN_ReleaseCall to MF calls or relay all MO calls to original SCP.<br>In all cases, the next step (9) occurs. |
| 9 | Visited MSC releases the call towards the HPMN. |
| 10 | GMSC receives the release from the visited network, and passes it to the IntelliGate - using ISUP REL message or IN_ERB message. |
| 11 | IntelliGate does NOT pass the release on.<br>Instead, it sends Resume Call Handling (RCH) MAP message towards the GMSC, specifying the Call Reference of the call (as received in the PRN), the Forwarding Reason and any required additional information (like the forwarding information, O-CSI etc). |
| 12 | GMSC performs the SOR logic, which causes it to release the forward leg towards the IntelliGate. |
| 13 | GMSC continues the SOR logic, routing the call towards the forwarded leg, i.e., Voicemail system. |
| 14 | Call is connected to destination forwarding. |

Figure 12:
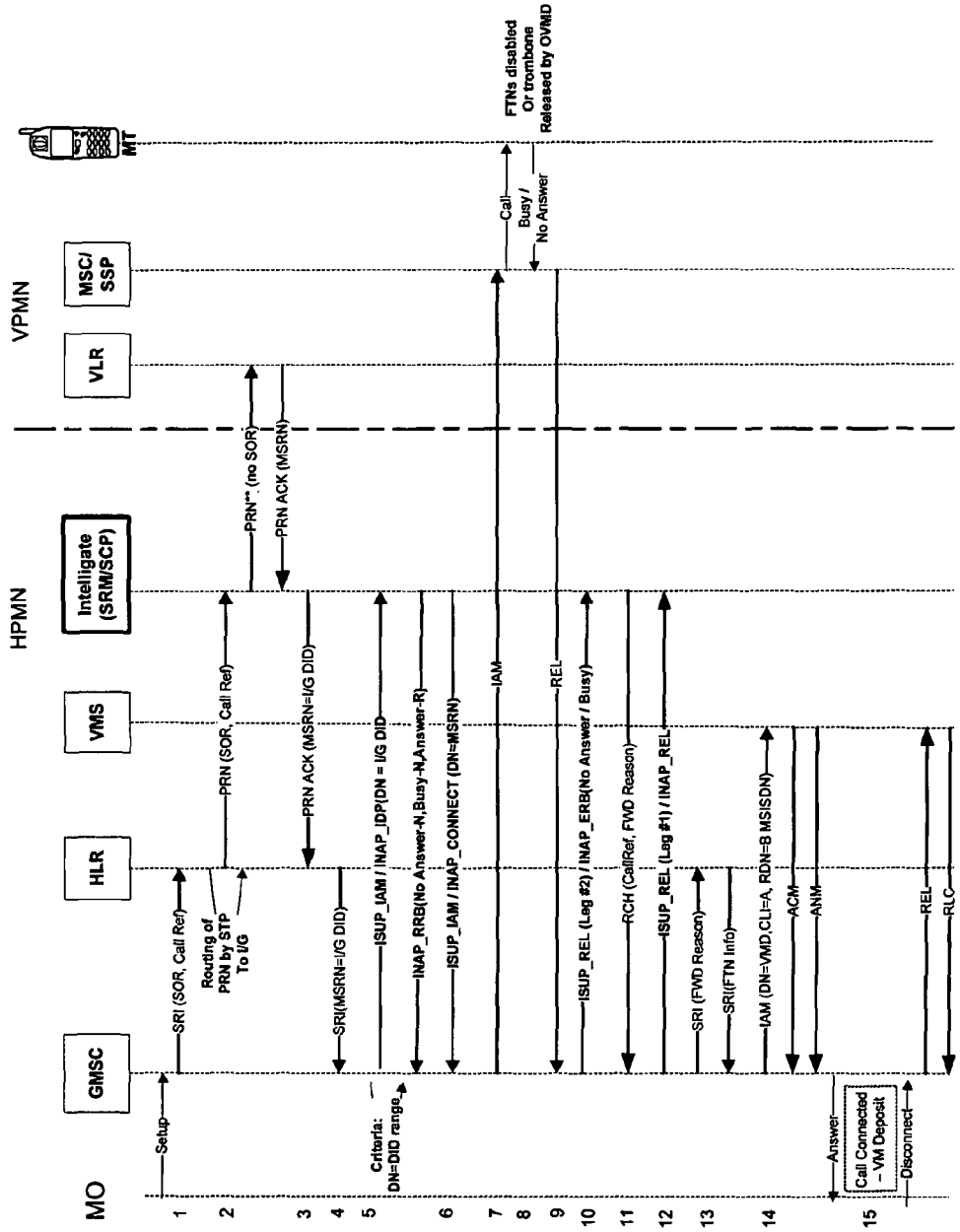
FIG. 12 is postpaid roaming user in a non-camel enabled visited network, according to the embodiment of FIG. 11 that uses a SOR emulator but this time based specifically on an SCCP relay.

Reference is now made to FIG. 12 which illustrates SOR emulation in the case that a postpaid Roamer is located in a Non CAMEL visited network VPMN. An SCCP Relay is used, as opposed to the probe in the embodiment of FIG. 11.

TABLE 9

SOR emulation for a Postpaid roaming user in a roaming network which is
neither Camel nor SOR enabled. The emulator uses an SCCP relay.

| Step | Description |
|---|---|
| 1 | MT call reaches the GMSC.<br>All GMSCs and HLRs of the operator are configured to perform SOR for every MT call by roaming subscribers<br>(by specifying the relevant fields in the Send Routing Information (SRI) and Provide Roaming Number (PRN) MAP messages).<br>GMSC sends SRI message, specifying SOR is requested and the Call Reference. |
| 2 | All PRN messages directed to foreign VLRs are routed to the IntelliGate (by the operator's STP).<br>The IntelliGate removes all SOR-related features, and relays the PRN towards the original VLR. |
| 3 | All PRN ACK messages returning from foreign VLRs are routed to the IntelliGate (by the operator's STP).<br>The IntelliGate replaces the MSRN returned in the PRN ACK with its own DID numbers, and relays the PRN ACK to the HLR. |

TABLE 9-continued

SOR emulation for a Postpaid roaming user in a roaming network which is neither Camel nor SOR enabled. The emulator uses an SCCP relay.

| Step | Description |
|---|---|
| 4 | SRI with MSRN = DID is returned to the GMSC. |
| 5 | GMSC places a call towards the DID.<br>An ISUP routing rule or IN trigger routes the call to the IntelliGate, based on the DID prefix.<br>IntelliGate receives ISUP_IAM or IN_IDP message. |
| 6 | IntelliGate connects the call towards the original MSRN, by using another ISUP_IAM message or IN_CONNECT.<br>If using IN, IntelliGate arms the relevant DPs (Busy, No-Answer, Answer). |
| 7 | GMSC routes the call towards the MSRN, to the foreign MSC (through international link).<br>Call reaches the visited MSC (serving MSC of B Party). |
| 8 | B Party is not reachable/rejects the call/does not answer.<br>In order to prevent the trombone, the forwarded leg must be released, this can be achieved by one of the following options:<br>5. Having call forwarding disabled by the HLR during registration to the visited network (HLR not sending FTNs in MAP_ISD)<br>6. Having the IntelliGate send a following MAP_ISD (with disabled FTNs) after each MAP_ISD sent by HLR<br>7. Leaving the call forwarding setting as is, but disconnecting the forwarded leg that returns to the HPMN (disconnect is done by IntelliGate to all incoming calls with DN = VM Deposit)<br>8. In CAMEL VPMNs, redirect the O-CSI IDP to the IntelliGate to respond with a IN_ReleaseCall to MF calls or relay all MO calls to original SCP.<br>In all cases, the next step (9) occurs. |
| 9 | Visited MSC releases the call towards the HPMN. |
| 10 | GMSC receives the release from the visited network, and passes it to the IntelliGate - using ISUP REL message or IN_ERB message. |
| 11 | IntelliGate does NOT pass the release on.<br>Instead, it sends a Resume Call Handling (RCH) MAP message towards the GMSC, specifying the Call Reference of the call (as received in the PRN) and the Forwarding Reason. |
| 12 | GMSC performs the SOR logic, which causes it to release the forward leg towards the IntelliGate DID. |
| 13 | GMSC continues the SOR logic, sending an SRI message towards the HLR, requesting the forwarding information for the specified forwarding reason. |
| 14 | The GMSC routes the call towards the forwarded leg, i.e., Voicemail system. |

SUMMARY

All of the optimal voicemail deposit methods have the advantages that they eliminate tromboning, meaning they bypass international leg for voicemail, significantly reducing costs to the subscriber. They thus encourage greater use of the mobile phone and voicemail, in particular by optimizing user experience and significantly reducing voicemail deposit costs. In each case described there is no dependency on the visited network since different workflows are available for each different visited network configuration. That is to say the same solution enables the elimination of voicemail trombone and recovery of lost revenue without any dependency on the visited network.

It is expected that during the life of this patent many relevant devices and systems will be developed and the scope of the terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for management of optimal voicemail deposit to the voicemail of a currently roaming mobile telephony user during late call forwarding, the apparatus being located at the home network of said user, the apparatus comprising:
a triggering unit located at said home network, configured to set triggers for a mobile terminated call directed from a caller to said currently roaming mobile telephony user of the home network, one of said triggers indicating a late forwarding status of a call, as said call is forwarded back to said home network when unanswered, such that as said roaming user is currently roaming in a visited network, and the mobile call connects from said home network over an International link in order to terminate with said roaming user in said visited network, and is late forwarded over the International link to said apparatus at the home network after failure to answer by said roaming mobile telephony user, said late forwarding is indicated at said home network by said trigger;
a disconnection unit located at said home network, operative, in response to triggering from said home network located triggering unit, to match said late forwarded leg to a respective outgoing leg across said home network, to disconnect said international link of said mobile terminated call following subjecting of said call to said late call forwarding; and
a direct forwarding unit operative to receive said call after said late forwarding for said control, and to further forward said caller to said voicemail, thereby providing an optimal voicemail deposit without said international links but within said home network.

2. The apparatus of claim 1, wherein said triggering unit comprises an emulator for emulating Standard Optical Routing signals from the roaming network.

3. The apparatus of claim 2, wherein said emulator is connected to a signaling probe, thereby to obtain international signaling data.

4. The apparatus of claim 2, wherein said emulator is connected to a signaling relay of international signaling data.

5. Method for management of optimal voicemail deposit to the voicemail of currently roaming mobile telephony user during late call forwarding, the method being carried out at the home network of said user, the method comprising:

forwarding a call from a caller to a roaming user at a roaming network from said home network;

providing at said home network a trigger signal to indicate that said call forwarded to said roaming network is unanswered, said indicating being during passing control of a late forwarded call from said roaming network to said home network to allow direct forwarding to a respective voicemail;

determining that the forwarded call is not answered;

when determining that the forwarded call is not answered, said determining being as a result of activation of said home network trigger signal, disconnecting the call at the roaming network, late forwarding the call back to the home network; matching the late forwarded call to the respective originating call, and disconnecting an international link associated with said call; and using said trigger, connecting said caller to said voicemail without said international link, thereby to make a direct voicemail deposit.

6. The method of claim 5, comprising emulating Standard Optical Routing (SOR) signals from the roaming network.

7. The method of claim 6, wherein said emulating is based on International signaling detected by a probe.

8. The method of claim 6, wherein said emulating is based on international signaling data obtained from a relay.

9. Apparatus for management of optimal voicemail deposit to the voicemail of a currently roaming mobile telephony subscriber during late call forwarding, the apparatus being located at the home network of said user, the apparatus comprising:

a triggering unit configured to set, at said home network, a home network trigger for a mobile terminated call directed from a caller to said roaming subscriber of the home network wherein said roaming subscriber is currently roaming in a visited network, the trigger indicating an unanswered status of said call, the mobile call thus connecting from said home network over an International link in order to terminate in said visited network, then late forwarded over the international links to the apparatus at the home network after not being answered by the subscriber, such that when the call is disconnected at the visited network after being identified as a late forwarding call, the control of the call is handed over for direct forwarding within said home network, said direct forwarding within said home network being carried out depending on said trigger indicating that said call was forwarded to said roaming network and unanswered, said setting being irrespective of triggering being required for other purposes;

a disconnection unit at said home network, for disconnecting said international link of said mobile terminated call in respone to said home network trigger, following subjecting of said call to said late call forwarding;

a direct forwarding unit at said home network, for carrying out said direct forwarding by forwarding said caller to said voicemail, thereby providing an optimal voicemail deposit without the inclusion of international links.

* * * * *